United States Patent
Azuma

(10) Patent No.: US 10,284,816 B2
(45) Date of Patent: May 7, 2019

(54) FACILITATING TRUE THREE-DIMENSIONAL VIRTUAL REPRESENTATION OF REAL OBJECTS USING DYNAMIC THREE-DIMENSIONAL SHAPES

(71) Applicant: Ronald T. Azuma, San Jose, CA (US)

(72) Inventor: Ronald T. Azuma, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/665,939

(22) Filed: Mar. 23, 2015

(65) Prior Publication Data
US 2016/0284121 A1  Sep. 29, 2016

(51) Int. Cl.
| G06T 17/20 | (2006.01) |
| H04N 7/15 | (2006.01) |
| H04N 7/14 | (2006.01) |
| H04N 13/388 | (2018.01) |
| G02B 27/22 | (2018.01) |

(52) U.S. Cl.
CPC .............. H04N 7/157 (2013.01); H04N 7/147 (2013.01); H04N 13/388 (2018.05); G02B 27/2271 (2013.01)

(58) Field of Classification Search
CPC ......... G06T 17/20; G06T 19/00; G06T 17/00; G06T 17/10; G06T 17/005
USPC ....................................................... 345/420
See application file for complete search history.

(56) References Cited

U.S. PATENT DOCUMENTS

| 5,793,918 A | 8/1998 | Hogan | |
| 6,903,871 B2* | 6/2005 | Page | B29C 33/307 359/277 |
| 9,298,264 B2* | 3/2016 | Leithinger | G06F 3/017 |
| 2004/0104935 A1* | 6/2004 | Williamson | G06F 3/012 715/757 |
| 2004/0207599 A1* | 10/2004 | Kurtenbach | G02B 27/2271 345/156 |
| 2007/0133845 A1 | 6/2007 | Fradkin et al. | |
| 2012/0306876 A1 | 12/2012 | Shotton et al. | |

(Continued)

FOREIGN PATENT DOCUMENTS

| EP | 2736247 | 5/2014 |
| WO | 2010/004563 A1 | 1/2010 |

OTHER PUBLICATIONS

"The Office of the Future: A Unified Approach to Image-Based Modeling and Spatially Immersive Displays" (Computer Graphics Proceedings, Annual Conference Series, 1998, by Ramesh Raskar, Greg Welch, Matt Cutts, Adam Lake, Lev Stesin, and Henry Fuchs).*

(Continued)

*Primary Examiner* — Gordon G Liu
(74) *Attorney, Agent, or Firm* — Womble Bond Dickinson (US) LLP

(57) ABSTRACT

A mechanism is described for facilitating true three-dimensional (3D) virtual imaging on computing devices. A method of embodiments, as described herein, includes computing a virtual 3D model corresponding to an object. The method may further include computing and projecting, based the virtual 3D model, a unified surface image of the object via a dynamic 3D shape component, and generating and rendering a virtual image of the object based on the unified surface image such that the virtual image is capable of floating in air.

22 Claims, 18 Drawing Sheets

(56) References Cited

U.S. PATENT DOCUMENTS

2012/0320039 A1    12/2012  Ha et al.
2013/0194648 A1*   8/2013   Otsubo ................. G02B 26/04
                                                         359/227
2015/0062700 A1    3/2015   Otsubo

OTHER PUBLICATIONS

PCT/US2016/016446, Notification of Transmittal of the International Search Report and the Written Opinion of the International Searching Authority, or the Declaration, 15 pages, dated May 25, 2016.
International Preliminary Report on Patentability received for PCT Patent Application No. PCT/US2016/016446, dated Oct. 5, 2017, 12 pages.
European Search Report and Written Opinion received for EP Patent Application No. 16769203.7, dated Oct. 5, 2018, 10 pages.

* cited by examiner

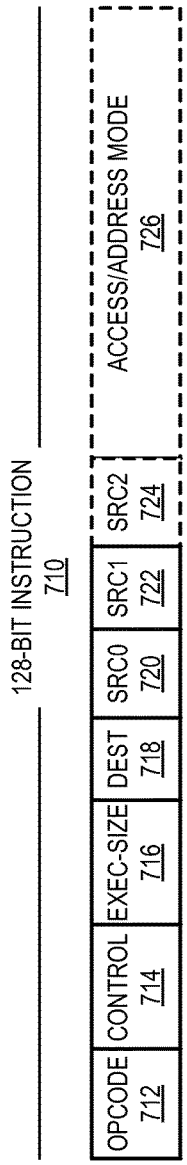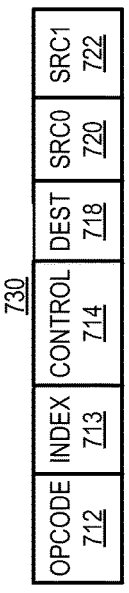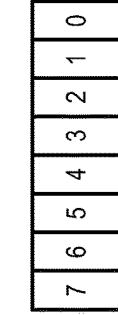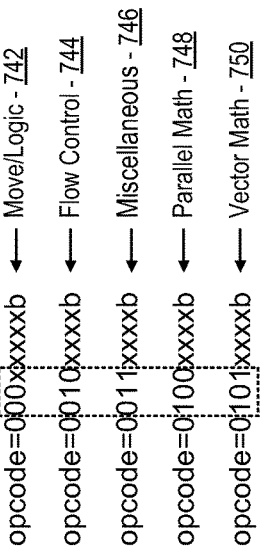
FIG. 7

FIG. 9A GRAPHICS PROCESSOR COMMAND FORMAT
900
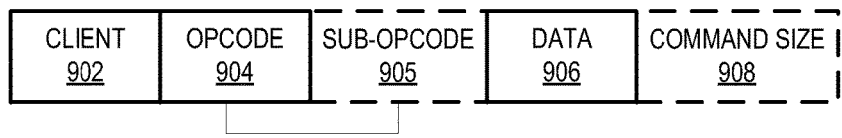
FIG. 9B GRAPHICS PROCESSOR COMMAND SEQUENCE
910
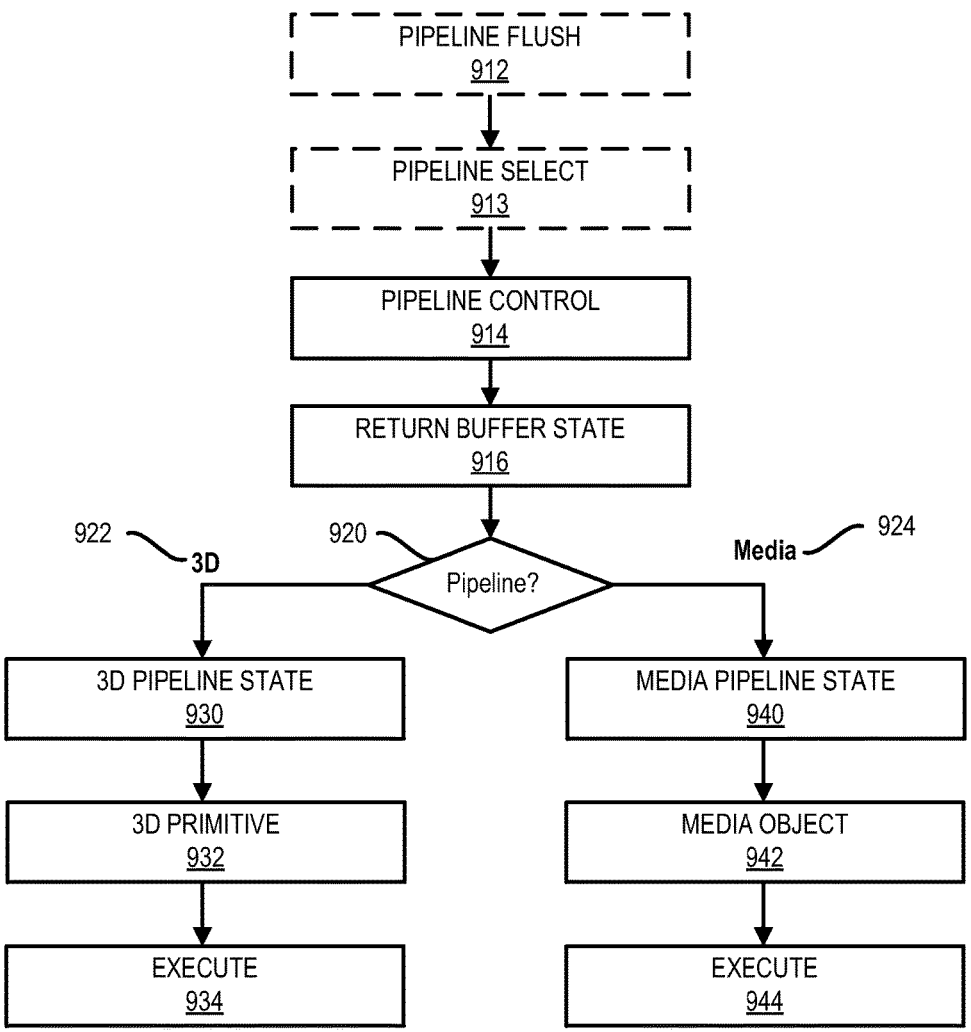

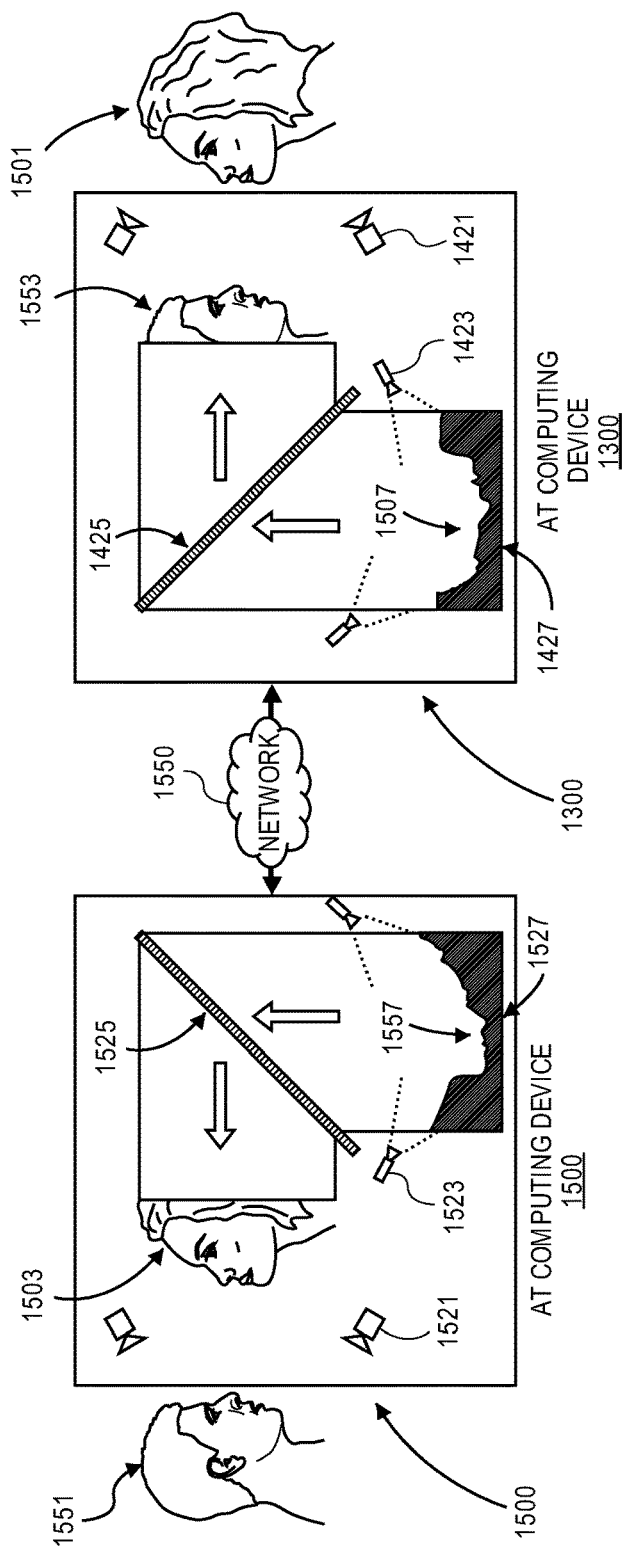

FACILITATING TRUE THREE-DIMENSIONAL VIRTUAL REPRESENTATION OF REAL OBJECTS USING DYNAMIC THREE-DIMENSIONAL SHAPES

FIELD

Embodiments described herein generally relate to computers. More particularly, embodiments relate to a mechanism for facilitating true three-dimensional virtual representation of real objects using dynamic three-dimensional shapes at computing devices.

BACKGROUND

Conventional techniques provide for three-dimensional (3D) stereo displays that require special glasses or autostereoscopic displays that are limited to left-right motion and have conflicts, such as convergence-accommodation conflicts, etc., which can cause discomfort and eyestrain.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor instruction formats according to some embodiments.

FIG. 9A is a block diagram illustrating a graphics processor command format according to an embodiment and FIG. 9B is a block diagram illustrating a graphics processor command sequence according to an embodiment.

FIG. 15B illustrates multiple true 3D virtual images being rendered at computing device as facilitated by the true 3D virtual imaging mechanism of FIGS. 13-14 according to one embodiment.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel imaging technique for enabling and generating hologram effects without necessarily having to use holographic approaches. In one embodiment, a true 3D virtual representation is generated that a user may be able to see without having to wear glasses or encountering convergence-accommodation conflicts that can cause eyestrain and discomfort. Similarly, in one embodiment, no head tracking is required and, unlike two-dimensional (2D) imaging, the virtual images have real depth. Further, the user may see the object in 3D while moving in any direction, such as forward and back, left and right, up and down, etc. For example and in one embodiment, a novel telepresence may be offered, such as a human face appearing in true 3D in front of a screen, as opposed to behind the screen as is typical for conventional techniques.

In one embodiment, an array of cameras may be used to capture high resolution imagery and depth information of a 3D real object, such as a human face, which may be segmented by a rendering system to then compute a 3D model which is rendered via one or more projectors onto a dynamic 3D shape component. Further, in one embodiment, an optical imaging plate may then re-image the 3D shape in mid-air in front of the image plate, generating a virtual 3D object that appears to float or exist in mid-air.

System Overview

Figure 1:
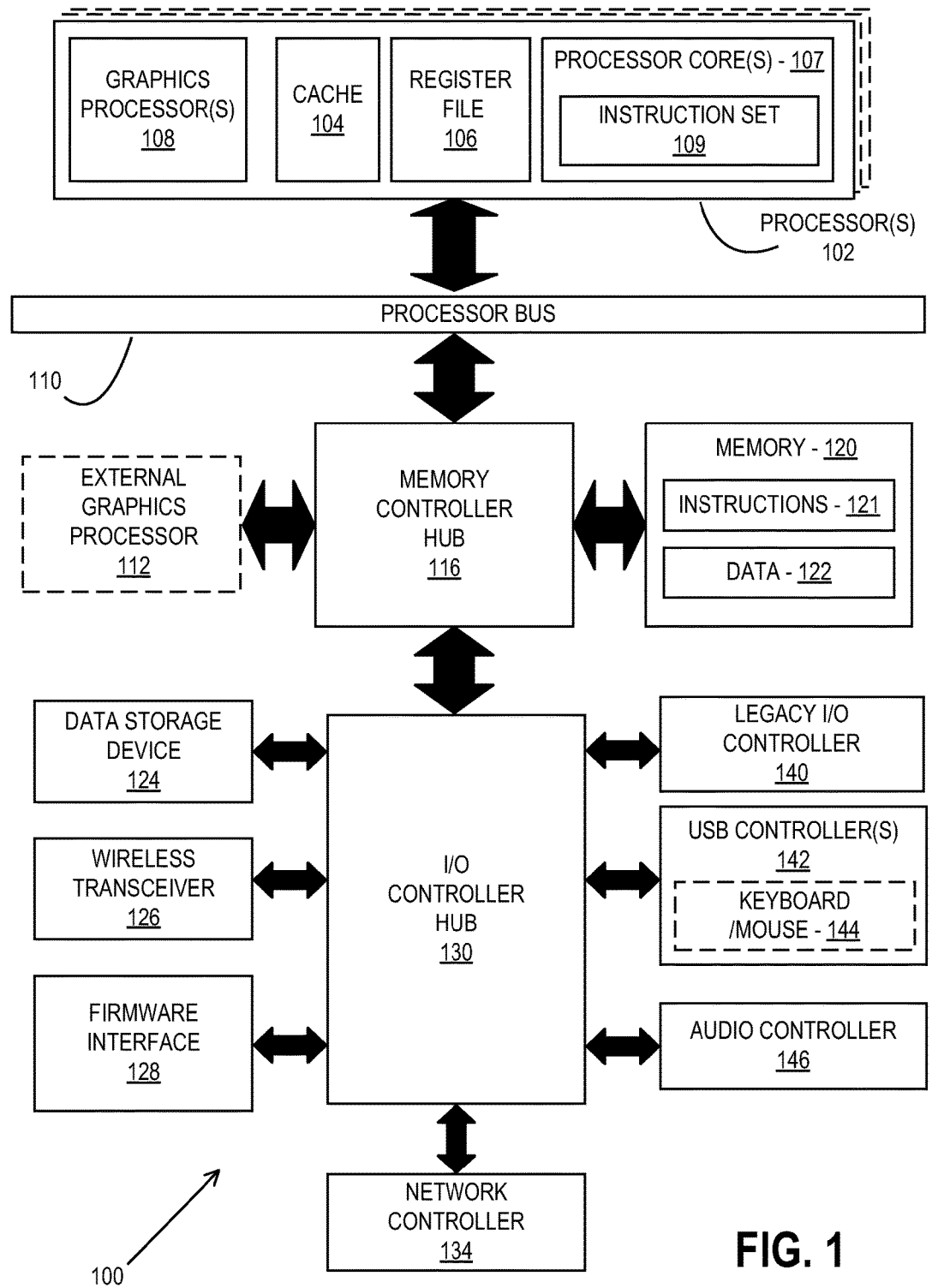
FIG. 1 is a block diagram of a processing system, according to an embodiment.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
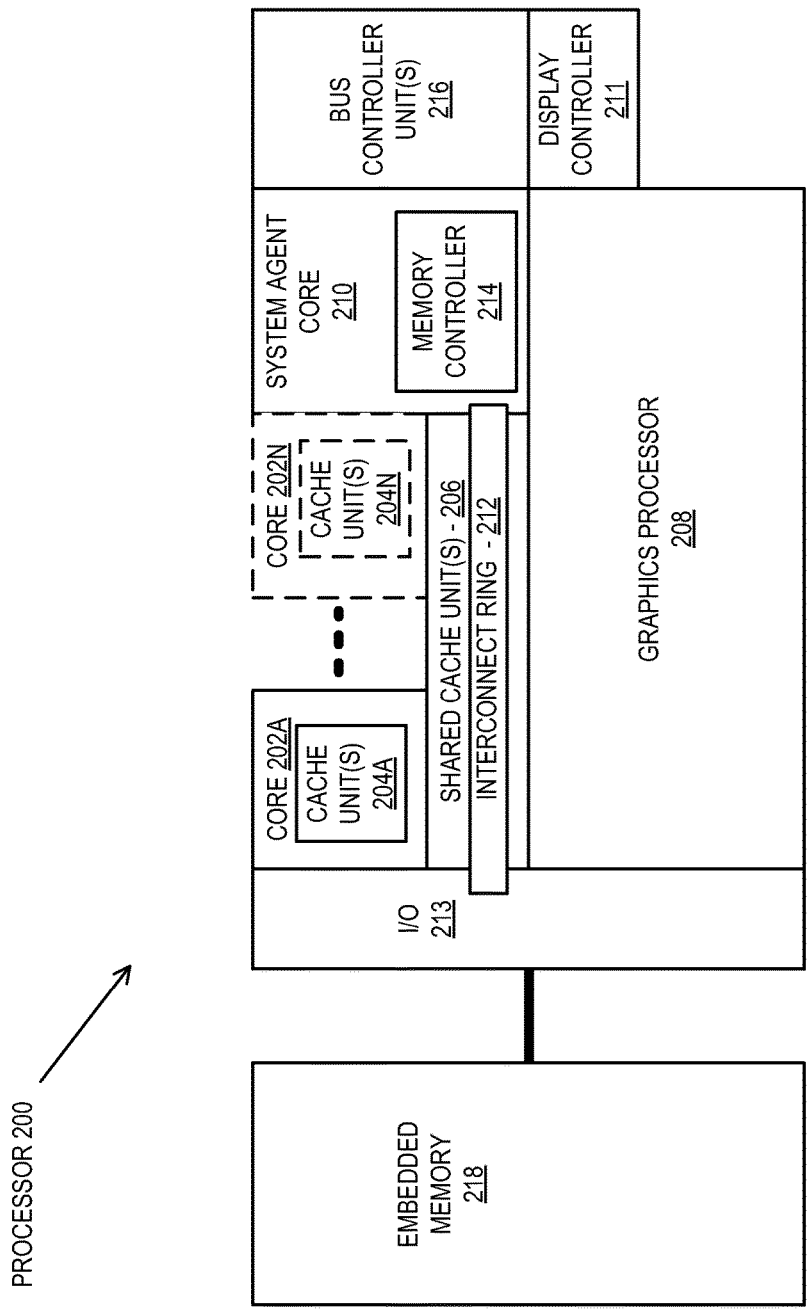
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
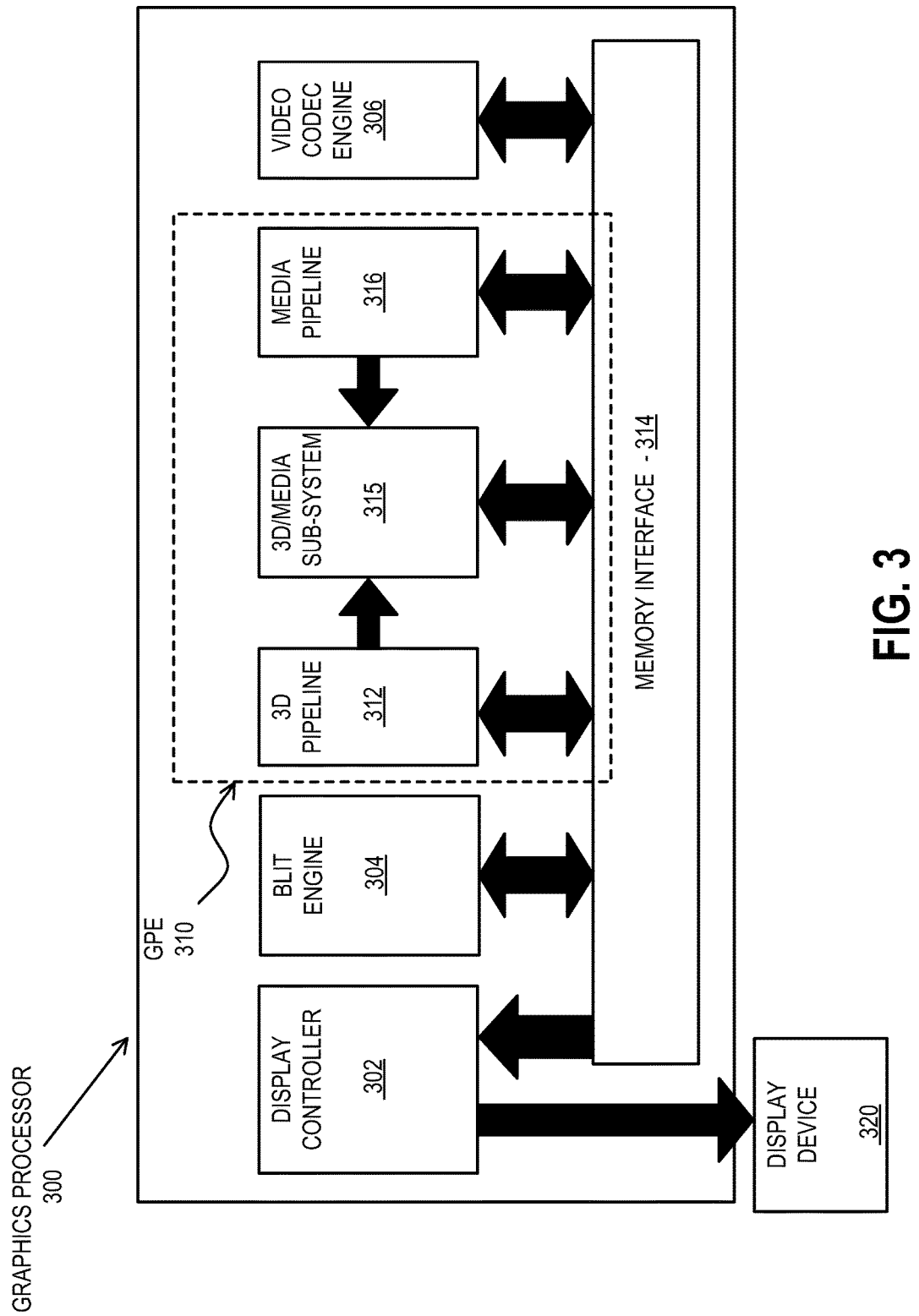
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
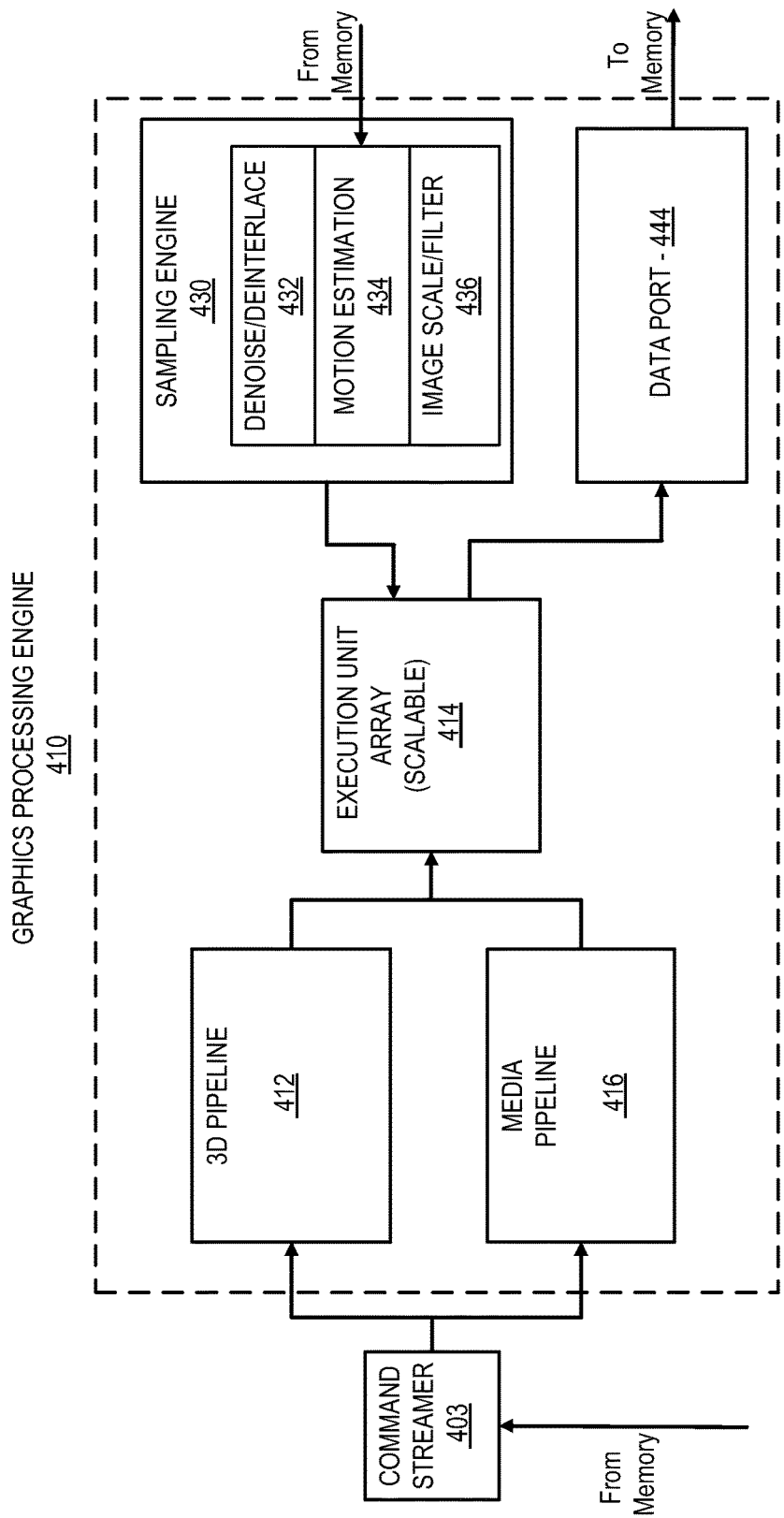
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
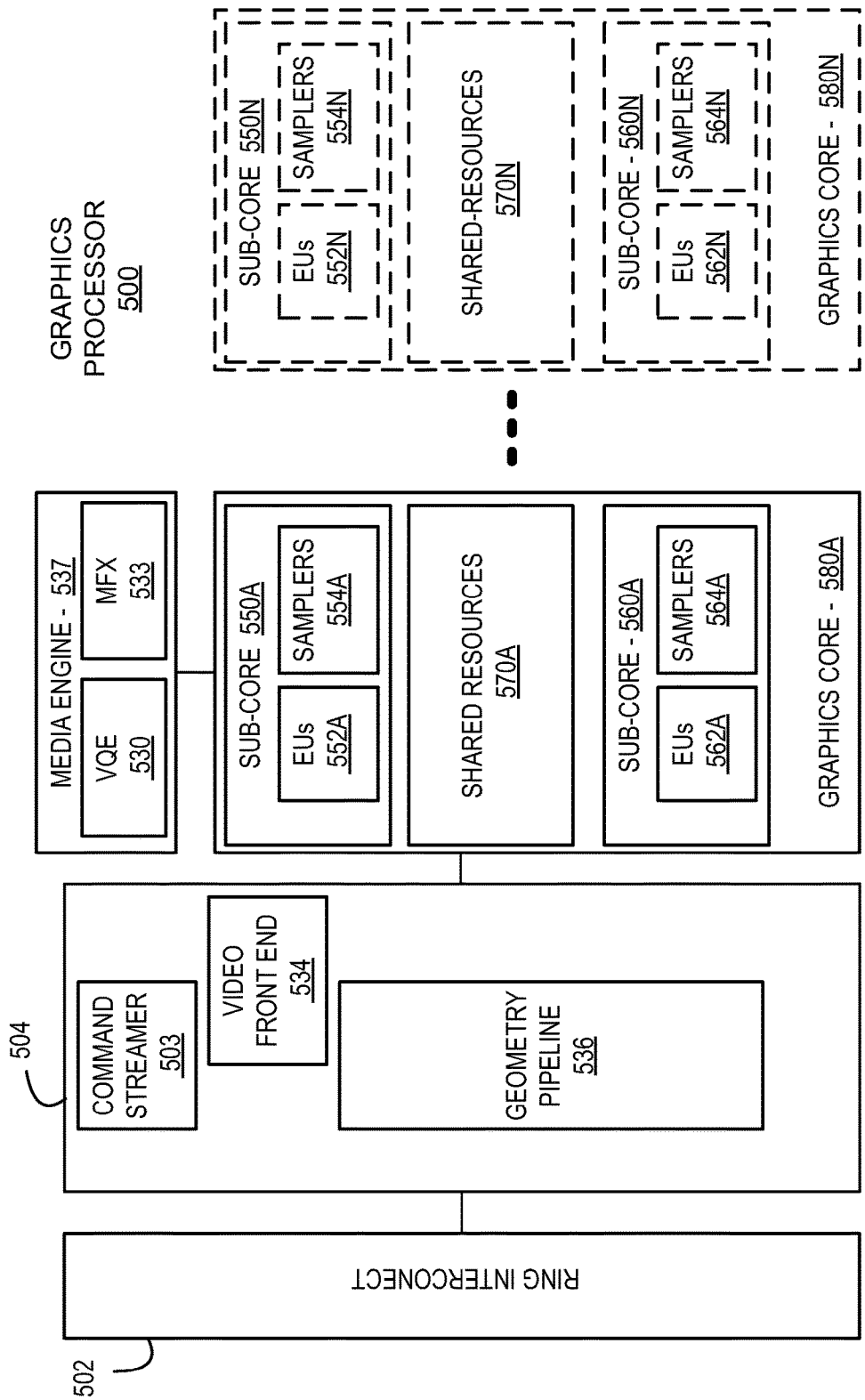
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
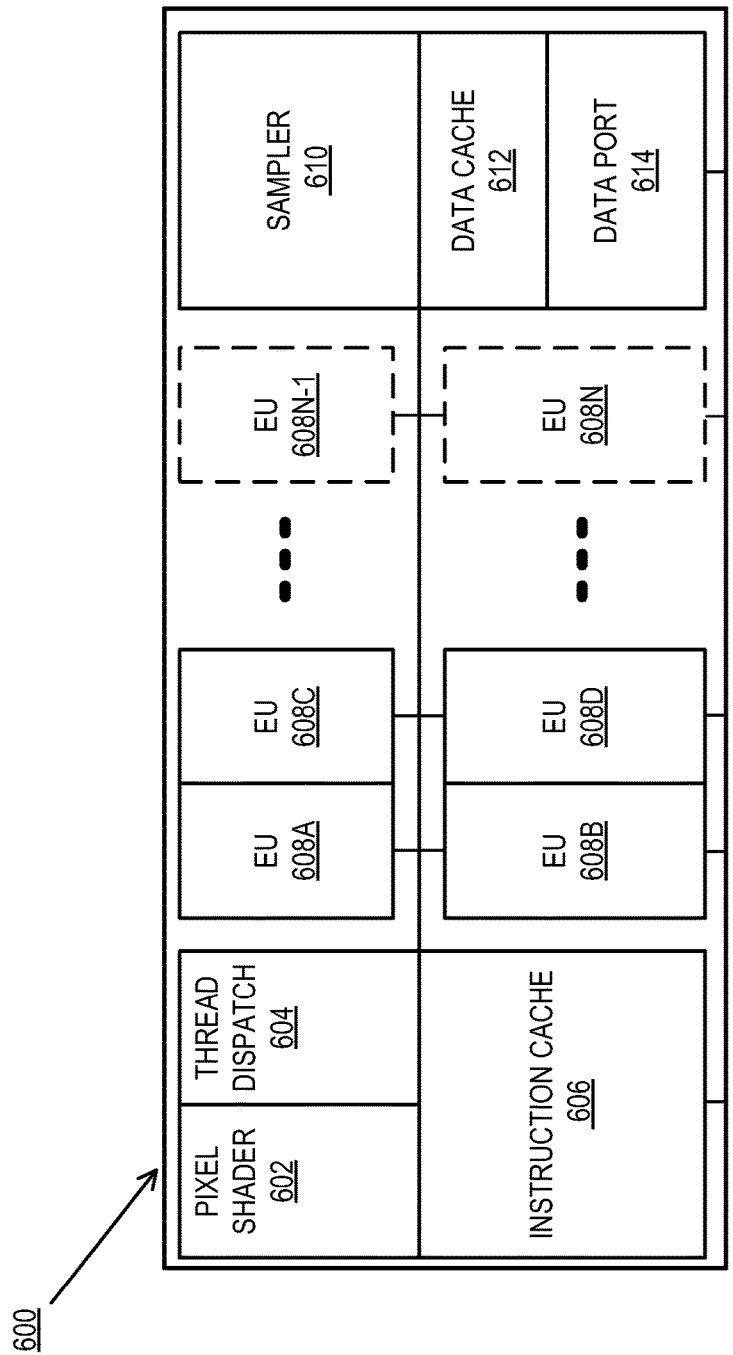
FIG. 6 illustrates thread execution logic including an array of processing elements employed in some embodiments of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
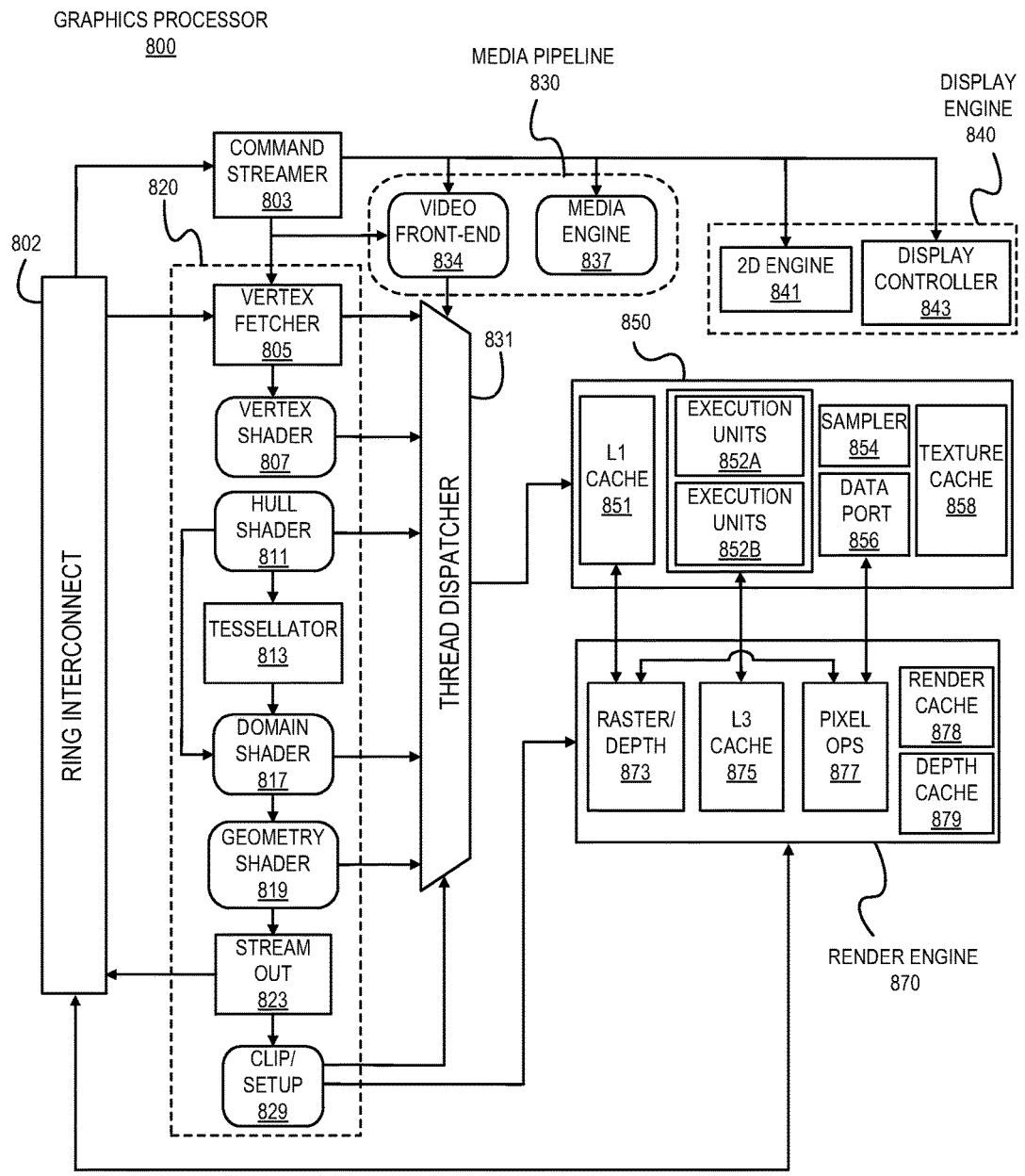
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
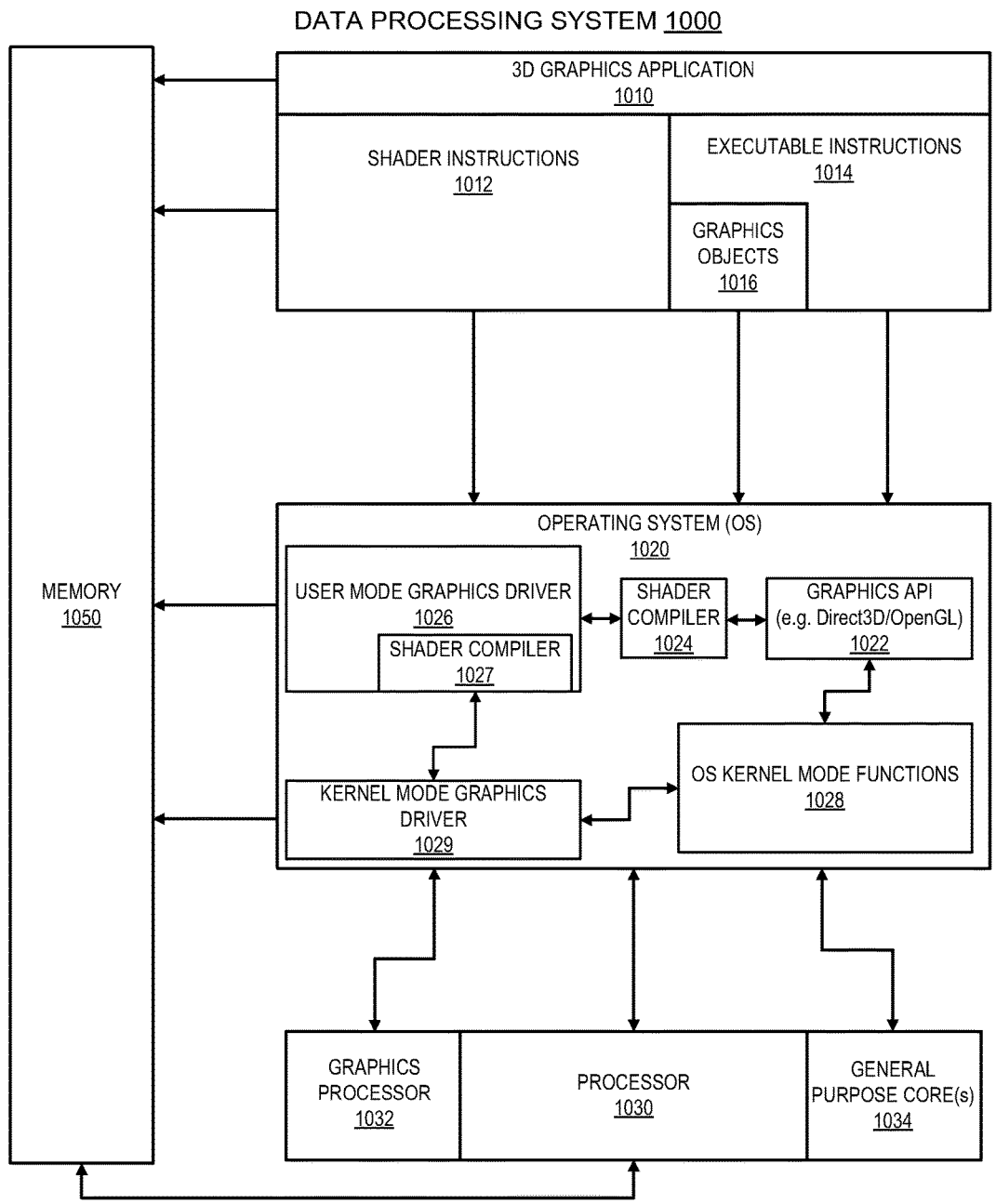
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
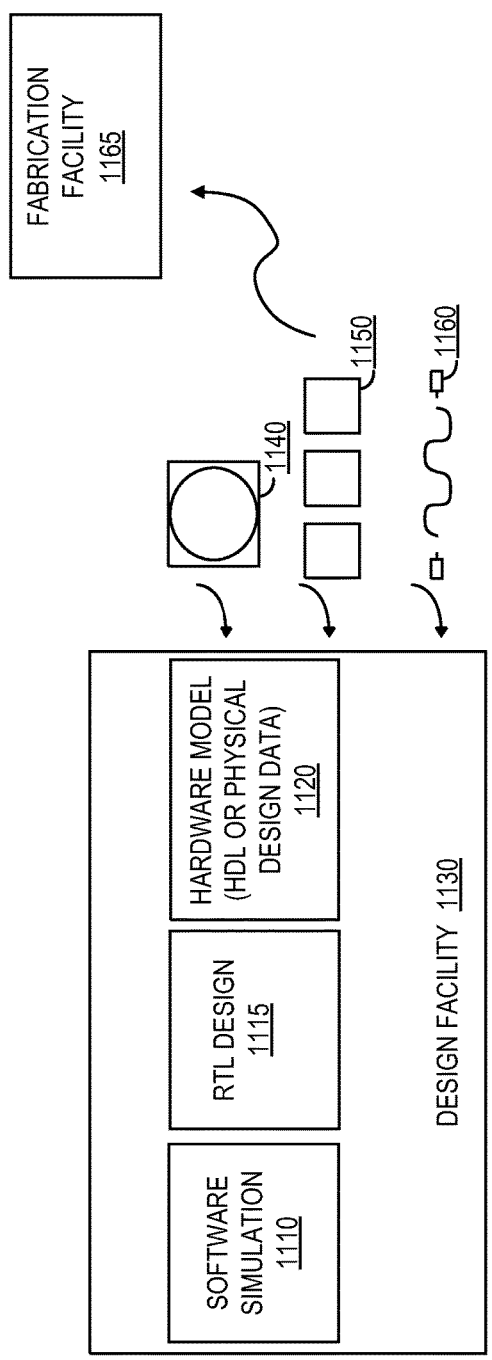
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
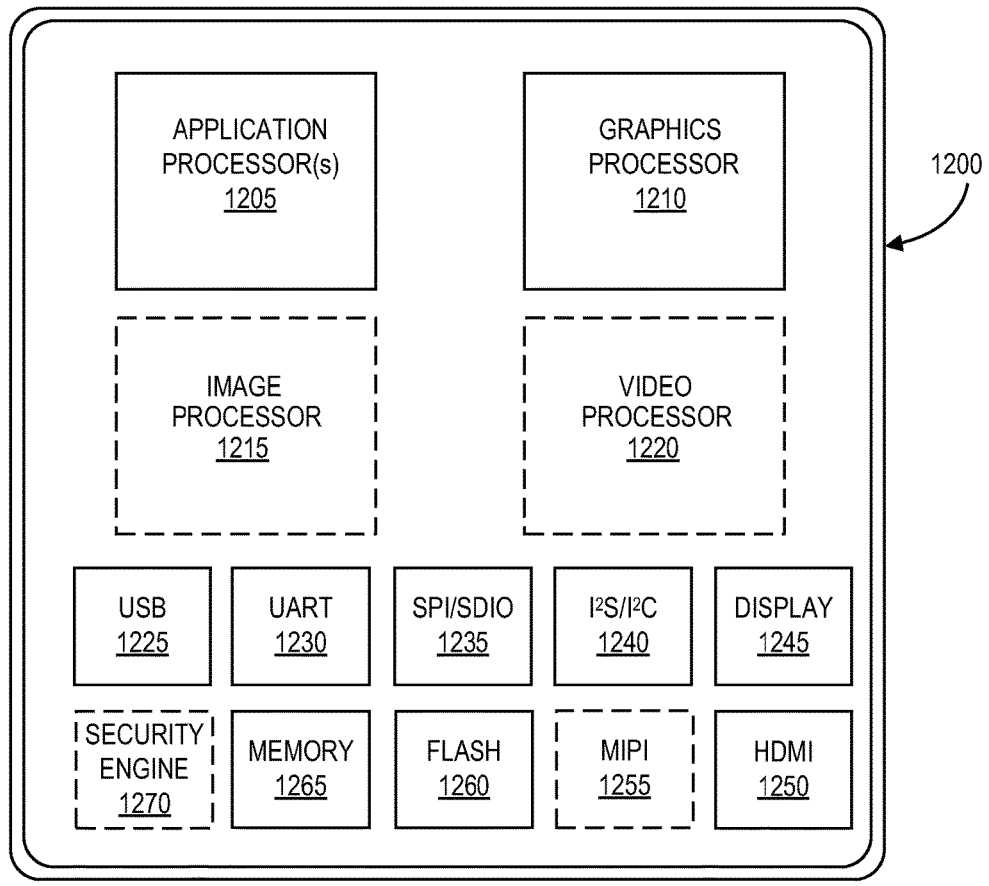
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Figure 13:
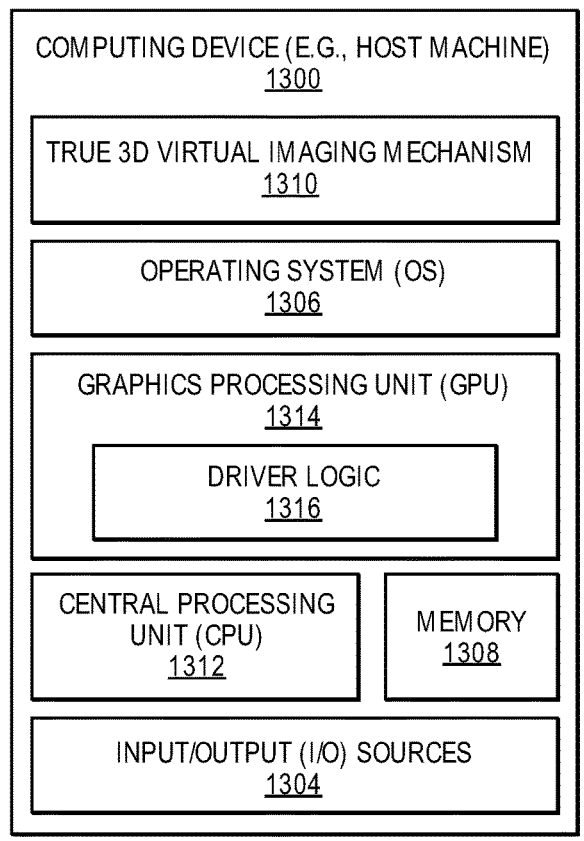
FIG. 13 illustrates a computing device employing a true 3D virtual imaging mechanism according to one embodiment.

FIG. 13 illustrates a computing device 1300 employing a true 3D virtual imaging mechanism 1300 according to one embodiment. Computing device 1300 (e.g., mobile computing device) may be the same as data processing system 100 of FIG. 1 and accordingly, for brevity and ease of understanding, many of the details stated above with reference to FIGS. 1-12 are not further discussed or repeated hereafter. Computing device 1300 may include a mobile computing device (e.g., smartphone, tablet computer, laptops, game consoles, portable workstations, etc.) serving as a host machine for hosting a true 3D virtual imaging mechanism ("imaging mechanism") 1310 for facilitating generation and rendering of true 3D virtual objects, floating in mid-air, having and reflecting actual depth of the objects such that the user (also referred to as "viewer", "observer", "person", "individual", and "end-user") may view and walk up to a virtual object even through the object. Imaging mechanism 1310 may include any number and type of components to perform various tasks relating to generation and rending of true 3D virtual objects, as will be further described throughout this document. It is to be noted that throughout this document, terms like "graphics domain" may be referenced interchangeably with "graphics processing unit" or simply "GPU" and similarly, "CPU domain" or "host domain" may be referenced interchangeably with "computer processing unit" or simply "CPU".

Computing device 1300 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1300 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 1300 may include a mobile computing device employing an integrated circuit ("IC"), such as system on a chip ("SoC" or "SOC"), integrating various hardware and/or software components of computing device 1100 on a single chip.

As illustrated, in one embodiment, in addition to employing imaging mechanism 1310, computing device 1300 may further include any number and type of hardware components and/or software components, such as (but not limited to) GPU 1314 (having driver logic 1316), CPU 1312, memory 1308, network devices, drivers, or the like, as well as input/output (I/O) sources 1304, such as touchscreens, touch panels, touch pads, virtual or regular keyboards, virtual or regular mice, ports, connectors, etc. Computing device 1300 may include operating system (OS) 1306 serving as an interface between hardware and/or physical resources of the computer device 1300 and a user. It is contemplated that CPU 1312 may include one or processors, such as processor(s) 102 of FIG. 1, while GPU 1314 may include one or more graphics processors, such as graphics processor(s) 108 of FIG. 1. In one embodiment and as will be further descried with reference to the subsequent figures, imaging mechanism 1310 may be in communication with its host driver logic 1316 which cooperates with GPU 1314 to facilitate any number and type of tasks facilitating generation and rendering of virtual 3D images as is described through this document.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-12, some processes of the graphics pipeline as described above are implemented in software, while the rest are implemented in hardware. A graphics pipeline may be implemented in a graphics coprocessor design, where CPU 1312 is designed to work with GPU 1314 which may be included in or co-located with CPU 1312. In one embodiment, GPU 1314 may employ any number and type of conventional software and hardware logic to perform the conventional functions relating to graphics rendering as well as novel software and hardware logic to execute any number and type of instructions, such as instructions 121 of FIG. 1, to perform the various novel functions of imaging mechanism 1310 as disclosed throughout this document.

As aforementioned, memory 1308 may include a random access memory (RAM) comprising application database having object information. A memory controller hub, such as memory controller hub 116 of FIG. 1, may access data in the RAM and forward it to GPU 1314 for graphics pipeline processing. RAM may include double data rate RAM (DDR RAM), extended data output RAM (EDO RAM), etc. CPU 1312 interacts with a hardware graphics pipeline, as illustrated with reference to FIG. 3, to share graphics pipelining functionality. Processed data is stored in a buffer in the hardware graphics pipeline, and state information is stored in memory 1308. The resulting image is then transferred to I/O sources 1304, such as a display component, such as display device 320 of FIG. 3, for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1308 may comprise a pre-allocated region of a buffer (e.g., frame buffer); however, it should be understood by one of ordinary skill in the art that the embodiments are not so limited, and that any memory accessible to the lower graphics pipeline may be used. Computing device 1300 may further include input/output (I/O) control hub (ICH) 130 as referenced in FIG. 1, one or more I/O sources/devices 1304, etc.

CPU 1312 may include one or more processors to execute instructions in order to perform whatever software routines the computing system implements. The instructions frequently involve some sort of operation performed upon data. Both data and instructions may be stored in system memory 1308 and any associated cache. Cache is typically designed to have shorter latency times than system memory 1308; for example, cache might be integrated onto the same silicon chip(s) as the processor(s) and/or constructed with faster static RAM (SRAM) cells whilst the system memory 1308 might be constructed with slower dynamic RAM (DRAM) cells. By tending to store more frequently used instructions and data in the cache as opposed to the system memory 1308, the overall performance efficiency of computing device 1300 improves. It is contemplated that in some embodiments, GPU 1314 may exist as part of CPU 1312 (such as part of a physical CPU package) in which case, memory 1308 may be shared by CPU 1312 and GPU 1314 or kept separated.

System memory 1308 may be made available to other components within the computing device 1300. For example, any data (e.g., input graphics data) received from various interfaces to the computing device 1300 (e.g., keyboard and mouse, printer port, Local Area Network (LAN) port, modem port, etc.) or retrieved from an internal storage element of the computer device 1300 (e.g., hard disk drive) are often temporarily queued into system memory 1308 prior to their being operated upon by the one or more processor(s) in the implementation of a software program. Similarly, data that a software program determines should be sent from the computing device 1300 to an outside entity through one of the computing system interfaces, or stored into an internal storage element, is often temporarily queued in system memory 1308 prior to its being transmitted or stored.

Further, for example, an ICH, such as ICH 130 of FIG. 1, may be used for ensuring that such data is properly passed between the system memory 1308 and its appropriate corresponding computing system interface (and internal storage device if the computing system is so designed) and may have bi-directional point-to-point links between itself and the observed I/O sources/devices 1304. Similarly, an MCH, such as MCH 116 of FIG. 1, may be used for managing the various contending requests for system memory 1308 accesses amongst CPU 1312 and GPU 1314, interfaces and internal storage elements that may proximately arise in time with respect to one another.

I/O sources 1304 may include one or more I/O devices that are implemented for transferring data to and/or from computing device 1300 (e.g., a networking adapter); or, for a large scale non-volatile storage within computing device 1300 (e.g., hard disk drive). User input device, including alphanumeric and other keys, may be used to communicate information and command selections to GPU 1314. Another type of user input device is cursor control, such as a mouse, a trackball, a touchscreen, a touchpad, or cursor direction keys to communicate direction information and command selections to GPU 1314 and to control cursor movement on the display device. Camera and microphone arrays of computer device 1300 may be employed to observe gestures, record audio and video and to receive and transmit visual and audio commands.

Computing device 1300 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1300 may vary from implementation to implementation depending upon numerous factors, such as price constraints, performance requirements, technological improvements, or other circumstances. Examples of the electronic device or computer system 1300 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 14:
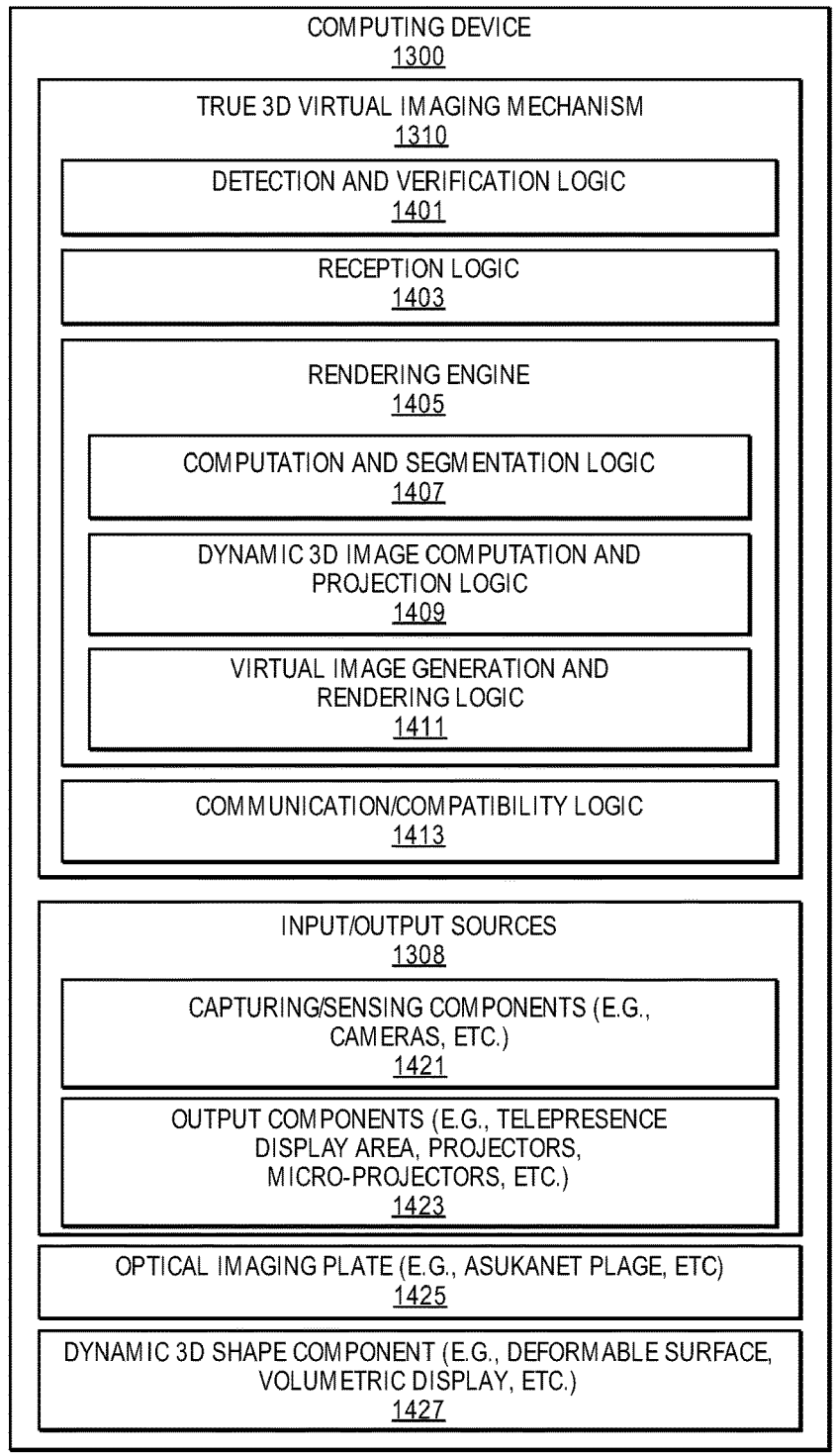
FIG. 14 illustrates a true 3D virtual imaging mechanism according to one embodiment.

FIG. 14 illustrates a true 3D virtual imaging mechanism 1310 according to one embodiment. In one embodiment, imaging mechanism 1310 may include any number and type of components to perform various tasks relating to facilitating true 3D virtual images at computing devices, such as computing device 1300 of FIG. 13. For example and in one embodiment, imaging mechanism 1310 may include (but not limited to): detection and verification logic 1401; reception logic 1403; rendering engine 1405 having segmentation and computation logic 1407, dynamic 3D image computation and projection logic 1409, and virtual image generation and rendering logic 1411; and communication/compatibility logic 1417.

It is contemplated that having employed imaging mechanism 1310, computing device 130 may act and alter its roles as transmitting device (also referred to as "source device") and receiving device (also referred to as "target device"). For example, when acting as a transmitting or source device, computing device 1300 faces a real 3D object (e.g., human face, human head, etc.) and performs the necessary tasks as facilitated by imaging mechanism 1310 to display a true 3D virtual image of the 3D object at another computing device (serving as a receiving or target device), such as computing device 1500 of FIG. 15B. Similarly, computing device 1300 may itself serve as a receiving or target device to receive any relevant information from another computing device or itself to process and project a virtual image corresponding to a 3D object. For example, in a network-like setup, as shown with reference to FIG. 15B, all participating computing devices may employ imaging mechanism 1310; however, for brevity, clarity, and ease of understanding, a single device, such as computing device 1300, is shown here to act as both the source and target device, having all the capabilities to perform all the tasks ranging from receiving the 3D real object and rendering the 3D virtual image of that object.

Computing device 1300 further includes other components that are in communication with imaging mechanism 1301, such other components include: I/O sources 1308 having capturing/sensing components 1421 (e.g., cameras, etc.) and output components 1423 (e.g., telepresence display areas, telepresence projectors, telepresence micro-projectors, etc.); optical imaging plate ("imaging plate") 1425 (e.g., Asukanet plate, etc.); and dynamic 3D shape component (such as deformable surface, volumetric display, etc.) 1427. It is further illustrated and as aforementioned with reference to FIG. 13, imaging mechanism 1310 may work in cooperation with one or more components of GPU 1314, such as driver logic 1316, of which in turn facilitates performance of one or more tasks relating to generation and rendering of true 3D virtual images.

Computing device 1300 may be in communication with one or more repositories or databases to store and maintain any amount and type of data (e.g., real-time data, historical contents, metadata, resources, policies, criteria, rules and regulations, upgrades, etc.). Similarly, as aforementioned, computing device 1300 may be in communication with any number and type of other computing devices over a network or communications medium, such as Cloud network, the Internet, intranet, Internet of Things ("IoT"), proximity network, Bluetooth, etc. It is contemplated that embodiments are not limited to any particular number or type of communication medium or networks.

Capturing/sensing components 1421 may include any number and type of capturing/sensing devices, such as one or more sending and/or capturing devices (e.g., cameras (e.g., three-dimension (3D) cameras, etc.), microphones, vibration components, tactile components, conductance elements, biometric sensors, chemical detectors, signal detectors, electroencephalography, functional near-infrared spectroscopy, wave detectors, force sensors (e.g., accelerometers), illuminators, etc.) that may be used for capturing any amount and type of visual data, such as images (e.g., photos, videos, movies, audio/video streams, etc.), and non-visual data, such as audio streams (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 1421 may further include one or more supporting or supplemental devices for capturing and/or sensing of data, such as illuminators (e.g., infrared (IR) illuminator), light fixtures, generators, sound blockers, etc.

It is further contemplated that in one embodiment, capturing/sensing components 1421 may further include any number and type of sensing devices or sensors (e.g., linear accelerometer) for sensing or detecting any number and type of contexts (e.g., estimating horizon, linear acceleration, etc., relating to a mobile computing device, etc.). For example, capturing/sensing components 1421 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

For example, capturing/sensing components 1421 may further include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 1421 may further include voice recognition devices, photo recognition devices, facial and other body recognition components, voice-to-text conversion components, etc.

Computing device 1300 may further include one or more output components 1423 in communication with one or more capturing/sensing components 1421 and one or more components of imaging mechanism 1310 to facilitate displaying of true 3D virtual images floating in mid-air, 2D images, playing or visualization of sounds, displaying visualization of fingerprints, presenting visualization of touch, smell, and/or other sense-related experiences, etc. For example, output components 1423 may include one or more display or telepresence projectors to project a realistic and true 3D virtual image that is capable of floating in the air and while having the depth of a real-life image. Further, output components 1423 may include tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 1423 may include (without limitation) one or more of light sources, display devices and/or screens (e.g., two-dimension (2D) displays, 3D displays, etc.), audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, etc.

In one embodiment, detection and verification logic 1401 may be used to detect and verify/authenticate one or more of an object, a request, a computing device, etc. This detection and verification may be performed occasionally or on a continuous basis as necessitated or desired. Further, although throughout this document, a user's human face is used as an example of an object, the object is not limited as such and may include one or more of a user, an animal, a thing, etc., such as a human face, a puppy, a painting, etc. For example and in one embodiment, an object, such as a human face of a user, may be detected by detection and verification logic 1401 and upon detection of the face, the user's request to be visualized in a 3D image, the computing device, etc., may also be detected and upon any one or more of these detections, any one or more of the user, the request, the computing device, etc., may be verified or authenticated before proceeding with other tasks by imaging mechanism 1310.

As will be further described with reference to FIG. 15B, two more computing devices may be used to perform the tasks of rendering true 3D virtual images and accordingly, in one embodiment, each computing device involved in the image rendering transaction may include the entire imaging mechanism 1310, such as computing device 1300 employing imaging mechanism 1310, while in some other embodiments, computing devices communicating over a network (e.g., Internet, Cloud network, etc.) may include partial imaging mechanism 1310, such as one or more components of imaging mechanism 1310 to perform their corresponding tasks, such as having the ability to rendering of an image received from another computing device without having the ability to generate one to be rendered elsewhere, etc.

In one embodiment, a real 3D object (such as a human face of a user) is placed in front of a single or an array of cameras of capturing/sensing components 1421 which captures high-resolution imagery of the object. This high-resolution imagery and any related information is then communicated on to reception logic 1403 where it is received and forwarded on to computation and segmentation logic 1407 for further processing. In one embodiment, computation and segmentation logic 1407 uses the high-resolution imagery and any related information to compute depth information of the object and then uses the computed depth information to segment the object out from the background of the object. The depth computation and object segmentation data is then communicated on to rendering engine 1405 for further computation and rending of a real 3D image.

In one embodiment, as aforementioned, the object may include a live object that is observed and captured, in real-time, using capturing/sensing components 1421 (e.g., one or more cameras) as facilitated by detection and verification logic 1401. Further, any high-resolution imagery associated with the live object may also be captured or computed, in real-time, using capturing/sensing components 1421 as facilitated by detection and verification logic 1401. In another embodiment, the object may include a recorded object that may have been recorded previously and currently stored at one or more computing devices, including computing device 1300, such that the recorded object may be obtained or received by reception logic 1403 by directly accessing the one or more computing device or indirectly via one or more communication applications, such as email applications, Short Messaging Service (SMS) applications, collaboration applications (e.g., business and/or social networking websites, etc.).

At rending engine 1405, in one embodiment, dynamic 3D image computation and projection logic 1409 receives the depth computation and object segmentation data relating to the high-resolution imagery of the object and uses this information to interpolate the imagery to generate a 3D model of the real object, where the image texture is laid upon that object is the image that would be captured by the camera looking at that object. Upon computing the 3D model of the real object by dynamic 3D image computation and projection logic 1409 may then use this model to compute the image that is to be projected by multiple projectors of output components 1425 onto computer-controlled deformable 3D real surface 1427.

In some embodiments, dynamic 3D shape component 1427 (such as deformable surface 1627 of FIG. 16) may change its geometry to match the captured depth that the camera array of capturing/sensing components 1421 measures from the real 3D object. Further, by projecting high-resolution textured imagery onto dynamic 3D shape component 1427, a real copy of the original 3D object is created by virtual image generation logic 1413, except that the image is inverted in depth. The image is inverted because the viewer at the other computing device (e.g., receiving device, target device), such as computing device 1500 of FIG. 15B, sees that dynamic 3D shape component 1427 through an optical imaging plate (e.g., Asukanet plate), such as imaging plate 1425, which reverses the depth direction in a manner analogous to how mirrors reverse the image in and out directions. For example, imaging plate 1425 may contain an array of corner cube reflectors that act to optically re-image dynamic 3D shape component 1427 to form a real 3D virtual image of that in mid-air.

In one embodiment, virtual image rendering logic 1415 renders the real 3D virtual image which is optically similar to having a real object at that mid-air location such that the viewer at the target computing device can see the virtual image with all its depth and without needing to wear glasses or requiring head tracking. For example, the viewer at the target device may move in any direction (such as forward and back, left and right, and up and down, etc.) such that the viewer may perceive the realistic 3D virtual image of the real object as if it actually existed in the projected spot as facilitated by virtual image rendering logic 1415. For example, this novel technique provides a novel telepresence experience where a full scale virtual 3D human head with depth may appear in the same space as the viewer rather than behind a screen. Further, for example, the dynamic 3D surface may be illuminated so that the virtual object in front of imaging plate 1425 also has depth. Additionally, the depth of the 3D virtual image as rendered by rendering engine 1405 that facilitates the virtual image to float or suspend in the air and allows the viewer to stick any part of their body, such as hands, head, etc., or other physical objects into and through the 3D virtual image.

Communication/compatibility logic 1417 may be used to facilitate dynamic communication and compatibility between one or more computing devices, such as computing device 1300 of FIG. 13, and any number and type of other computing devices (such as mobile computing device, desktop computer, server computing device, etc.), such as computing device 1500 of FIG. 15B, processing devices (such as central processing unit (CPU), graphics processing unit (GPU), etc.), image capturing devices (such as camera), display elements (such as display component, display device, display screen, etc.), user/context-awareness components and/or identification/verification sensors/devices (such as biometric sensor/detector, scanner, etc.), memory or storage devices, databases and/or data sources (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, term, phrase, name, and/or acronym, such as "GPU", "GPU domain", "CPU", "CPU domain", "real object", "3D", "virtual image", "rendering", "Asukanet plate", "imaging plate", "dynamic 3D shape component", "deformable surface", "volumetric display", "floating", "depth", etc., should not be read to limit embodiments to software or devices that carry that label in products or in literature external to this document.

It is contemplated that any number and type of components may be added to and/or removed from imaging mechanism 1310 to facilitate various embodiments including adding, removing, and/or enhancing certain features. For brevity, clarity, and ease of understanding of imaging mechanism 1310, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 15A:
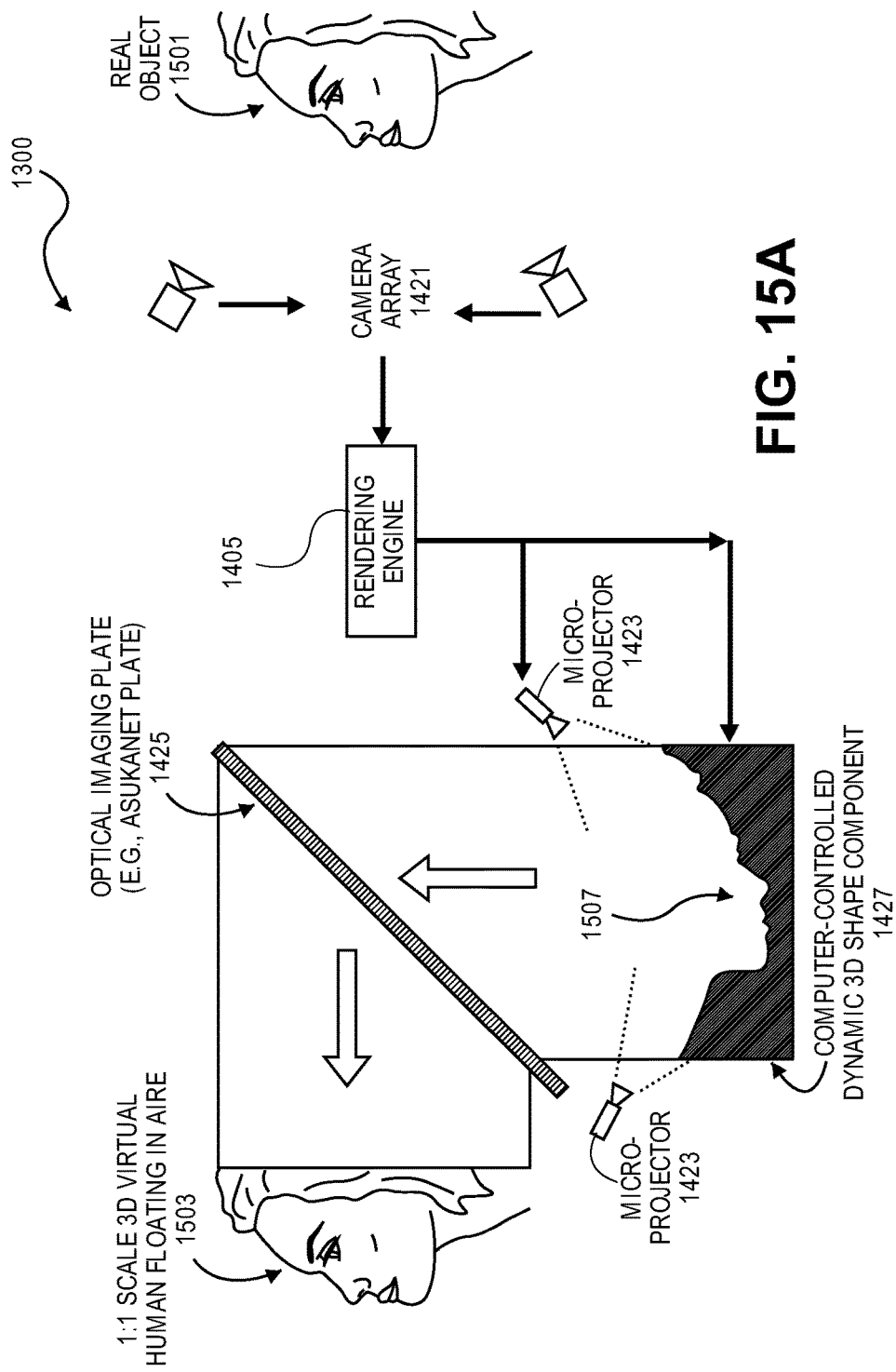
FIG. 15A illustrates a true 3D virtual image being rendered at computing device as facilitated by the true 3D virtual imaging mechanism of FIG. 13 according to one embodiment.

FIG. 15A illustrates a true 3D virtual image 1503 being rendered at computing device 1300 as facilitated by imaging mechanism 1310 of FIG. 13 according to one embodiment. As an initial matter, for brevity, clarity, and ease of understanding, many of the details previously discussed with reference to FIGS. 13-14 may not be repeated or discussed here or hereafter. In the illustrated embodiment, camera array 1421 (being part of capturing/sensing components 1421 that is part of I/O sources 1308 of FIG. 14) may have two or more cameras, as illustrated, facing toward a real 3D object 1501 (e.g., human face or head). For a telepresence application, going through the imaging processes as facilitated by various components of imaging mechanism 1310 of FIG. 14, the viewer on the other side of computing device 1300, serving as both source device and target device, may be looking directly at an optical imaging plate, such as imaging plate 1425 (e.g., Asukanet plate).

Further, in this situation, cameras 1421 may not be placed such that they look directly at 3D object 1501 from the same vantage point as the viewer and accordingly, as illustrated, real object 1501 associated with a user is placed at one side of computing device 1300, while 3D visual image 1503, being viewed by a viewer, is displayed at another side of computing device 1300 and accordingly, multiple cameras 1421 are used to capture the high-resolution imagery of 3D object 1501 from multiple angles. Further, high-resolution red-green-blue (RGB) imagery is captured through these cameras 1421 and used to compute the depth at each pixel as associated with real object 1501. This may be achieved in any number of ways, such as using active light to scan the environment, employing time-of-flight sensors, etc., as facilitated by rendering engine 1405 and its various components, such as computation and segmentation logic 1407, etc., as described with reference to FIG. 14.

In the illustrated embodiment, rendering engine 1405 is shown for segmenting 3D object 1501 from the background, as facilitated by computation and segmentation logic 1407 of FIG. 14. One option for accomplishing that is a simple thresholding operation in depth to identify and separate a distinct foreground object. As further described with reference to FIG. 14, rendering engine 1405 may then trigger other components to apply a view interpolation operation to synthesize a new synthetic image that represents the view of 3D object 1501 from a hypothetical camera that looks directly at 3D object 1501 from the viewer's viewpoint as facilitated by dynamic 3D image computation and projection logic 1409 of FIG. 14. This view interpolated image may then be applied as a texture upon the virtual 3D object using dynamic 3D image computation and projection logic 1409 and rendering engine 1405 may then compute the images that two or more micro-projectors may use to illuminate dynamic 3D shape component 1427 as facilitated by dynamic 3D image computation and projection logic 1409 of FIG. 14. In one embodiment, the 3D textured virtual object may be used by dynamic 3D image computation and projection logic 1409 of FIG. 14 to be rendered from the perspective of each micro-projector 1423 in relation to dynamic 3D shape component 1427 and when projected onto that dynamic 3D shape component 1427, surface image 1507 precisely matches with real object 1501.

Two or more projectors 1423 may blend their projected images seamlessly into a single unified image, such as surface image 1507, onto dynamic 3D shape component 1427. This blending and calibration of multiple images corresponding to multiple micro-projectors 1423 to obtain a single surface image 1507 that is a seamless and unified image being projected on dynamic 3D shape component 1427 may be performed using any number and type of blending techniques.

As will be further described with reference to FIG. 16, one example of dynamic 3D shape component 1427 may include a deformable surface, such as deformable surface 1627 of FIG. 16, having an array of physical movable rods which can move up and down as facilitated by dynamic 3D image computation and projection logic 1409 of FIG. 14, such that these rods can quickly move up and down to form or draw a mirror image, such as surface image 1507, of the real 3D object, such as 3D object 1501, in various characteristics, such as depth, form, features, etc. For example, if 3D object 1501 is a human face, then deformable surface 1627 of FIG. 16 may not have the rods extending upward but rather, the rods may move downward to form a concave shape, as opposed to a convex shape, precisely matching the human face that is 3D image 1501, because the viewer is expected to see an illuminated dynamic 3D surface 1427 (e.g., deformable surface, volumetric display, etc.) through optical imaging plate 1425 (e.g., Asukanet plate that is made with a fine array of corner cube reflections).

In one embodiment, as illustrated, imaging plate 1425 re-images a real object, such as 3D object 1501, on one side of computing device 1300 so that is may form a virtual image, such as true 3D virtual image 1503, at the same distance on the other side of computing device 1300. This virtual image 1503 may be perceived as if real object 1501 is in the exact location of that virtual image 1503, because dynamic 3D shape component 1427 is a 3D object, such as surface object 1507, and optical imaging plate 1425 reverses surface object 1507 in depth such that the viewer may view 3D virtual image 1503 of the desired 3D object 1501 in shape, form, depth, etc., while floating in the air.

The resulting experience for the viewer may be realistic as the viewer observes virtual object 1503 floating in mid-air as a true 3D object that is a realistic copy of 3D object 1501 as if virtual object 1503 was a real object at that location. Further, in one embodiment, virtual object 1503 may be bright with high-resolution and stay stable in space even as the viewer moves in any direction, such as left-right, up-down, and forward-back, etc. As aforementioned, the viewer may view virtual object 1503 without having to wear any special glasses or have their head tracked and further, this is all achieved without any conflict between convergence and accommodation since the optics mimic that of real 3D object 1501 in the same location. Embodiments provide for a comfortable viewing of virtual object 1503, avoiding any source of eyestrain that is typical with conventional 3D displays. Further, in employing dynamic 3D shape component 1427, the shape of true 3D virtual image 1503 may be dynamically changed and adjusted to accommodate a variety of usages.

FIG. 15B illustrates multiple true 3D virtual images 1503, 1553 being rendered at computing device 1300, 1500 as facilitated by imaging mechanism 1310 of FIGS. 13-14 according to one embodiment. For the sake of brevity, clarify, and ease of understanding most of the details provided in preceding figures may not be discussed or repeated hereafter. In the illustrated embodiment, multiple computing devices 1300, 1500, serving as both transmitting and receiving devices, employ imaging mechanism 1310 of FIGS. 13-14 to perform various tasks to produce 3D virtual images 1503 and 1553 corresponding to their 3D real images 1501 and 1551, respectively.

As aforementioned, both computing devices 1300, 1500 employ imaging mechanism 1310 of FIGS. 13-14 and serve as both the transmitting and receiving devices while in communication with each other over one or more networks, such as network 1550 (e.g., Internet, Cloud network, Bluetooth, proximity network, etc.). For example and in one embodiment, computing device 1300 may employ various components, such as cameras 1421, micro-projectors 1423, imaging plate 1425, dynamic 3D shape component 1427, etc., to generate virtual image 1503 corresponding to real object 1501 via surface image 1507 as facilitated by imaging mechanism 1310 of FIGS. 13-14. As illustrated, virtual image 1503 is observed (e.g., floating in mid-air) at computing device 1500 (as receiving device) that is in communication with computing device 1300 (as transmitting device) where real object 1501 is observed. Similarly, in one embodiment, computing device 1500 may employ various components, such as cameras 1521 (similar to or the same as cameras 1421), imaging plate 1525 (similar to or the same as imaging plate 1425), micro-projectors 1523 (similar to or the same as micro-projectors 1423), dynamic 3D shape component 1527 (similar to or the same as dynamic 3D shape component 1427), etc., to generate virtual image 1553 at computing device 1300 corresponding to real object 1551 via surface image 1557 as facilitated by imaging mechanism 1310 of FIGS. 13-14. As illustrated, virtual image 1553 is observed (e.g., floating in mid-air) at computing device 1300 (as receiving device) that is in communication with computing device 1500 (as transmitting device) where real object 1551 is observed. In one embodiment, both dynamic 3D shape components 1427, 1527 may be the same (such as deformable surface 1627 of FIG. 16) or in another embodiment, for example, dynamic 3D shape component 1427 may include a deformable surface, while dynamic 3D shape component 1527 may include a volumetric display.

It is contemplated that embodiments are not limited to merely two computing devices 1300, 1500 or two users being represented as two 3D objects 1501, 1551, etc., and that any number and type of computing devices may participate and communicate over any number and type of networks to generate and render any number of 3D virtual images, such as virtual images 1503, 1553, corresponding to any number and type of 3D real objects, such as real objects 1501, 1551. Further, although human faces or heads are used as real objects 1501, 1551, throughout this document, real objects 1501, 1551 of any type (e.g., plants, animals, furniture and other non-living objects, etc.) and dimensions (e.g., entire human body, panoramic views of a scenery, etc.) may be used and observed for their telepresence projection as virtual objects, such as virtual images 1503, 1553, floating in the air with depth, form, and other characteristics, of their corresponding real objects 1501, 1551. Similarly, embodiments are not limited to any particular technology and that any number and type of technologies may be used to perform certain tasks, such as, in some embodiments, dynamic 3D shape component 1427, 1527, may be combined with other optical imaging technologies to achieve virtual images 1503, 1553.

Figure 16:
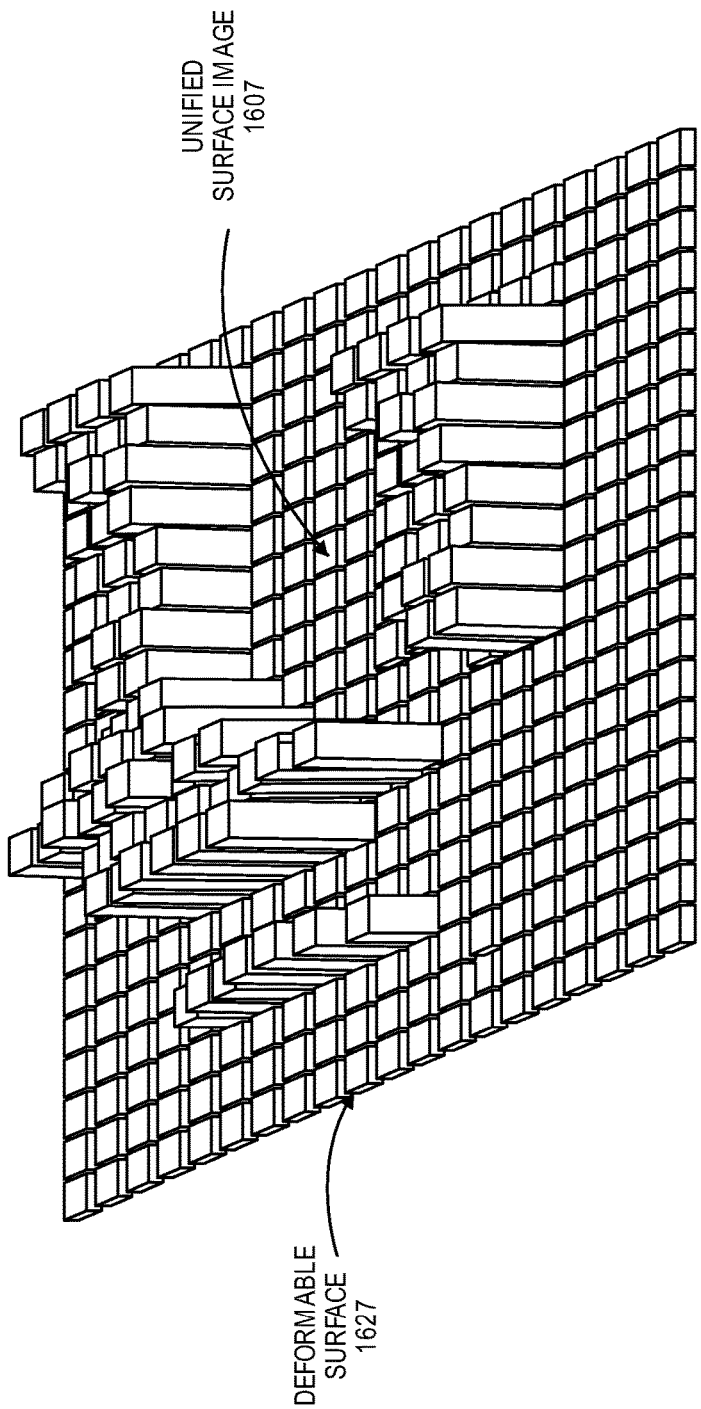
FIG. 16 it illustrates a computer-controlled deformable surface according to one embodiment.

Referring now to FIG. 16, it illustrates a computer-controlled deformable surface 1627 according to one embodiment. As aforementioned with reference to FIGS. 14, 15A, and 15B, dynamic 3D shape components 1427, 1527 may include deformable surfaces, such as the illustrated deformable surface 1627 including a surface where hardware, under control, changes the depth of different points on the surface to match the geometry of the captured 3D object, such as 3D object 1501 of FIG. 15A, using one or more techniques to demonstrate an array of physical rods, where each individual rod can quickly move up or down to help form a unified surface image 1607, such as surface image 1507 of FIG. 15A. This technique enables low resolution physical shapes to appear, such as hands, faces, or any other type of object. In one embodiment, an array of thin metal rods that move up and down may be used, where the end of each rod may be attached to a stretchable surface material, such as a pantyhose, etc.

Further, deformable surface 1627 may include diffuse material that is suitable to reflect on the projected image as unified surface image 1607 onto that deformable surface 1627. This technique allows for a higher resolution for a better viewing experience for the viewer since the images projected by short-throw projectors is likely to be much higher than the physical resolution of the points that change in any practical deformable surface, such as deformable surface 1627. Other embodiments may be used to achieve a deformable illuminated 3D surface, such as deformable surface 1627; for example, other embodiments may include avoiding the projections by building a self-illuminated surface where fiber optics may deliver light to the surface itself, or employing miniature display elements at the tips of each rod that moves up and down.

Figure 17:
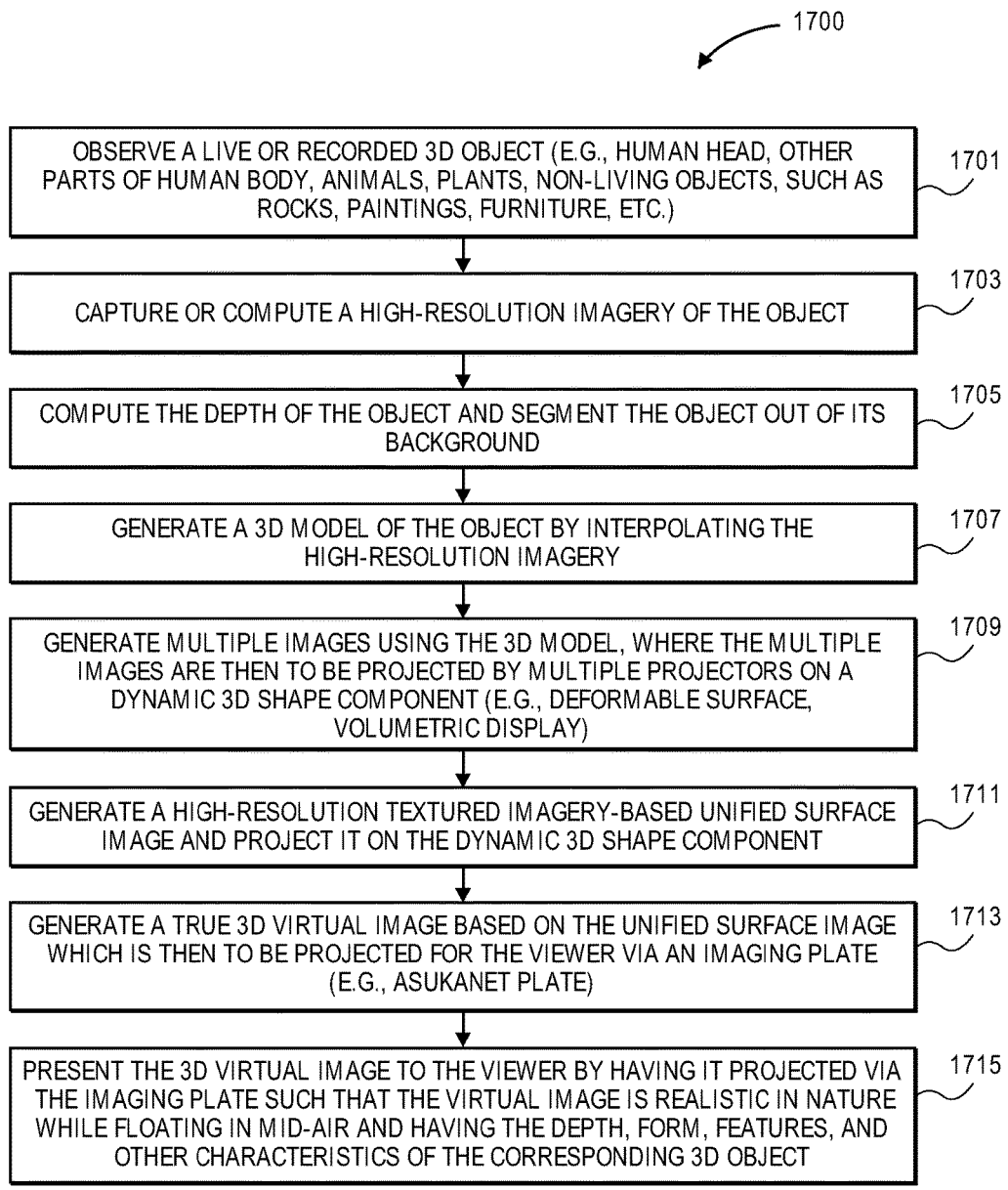
FIG. 17 illustrates a method for generating and rendering true 3D virtual images of 3D real objects according to one embodiment.

FIG. 17 illustrates a method 1700 for generating and rendering true 3D virtual images of 3D real objects according to one embodiment. Method 1700 may be performed by processing logic that may comprise hardware (e.g., circuitry, dedicated logic, programmable logic, etc.), software (such as instructions run on a processing device), or a combination thereof. In one embodiment, method 1700 may be performed by imaging mechanism 1310 of FIGS. 13-14. The processes of method 1700 are illustrated in linear sequences for brevity and clarity in presentation; however, it is contemplated that any number of them can be performed in parallel, asynchronously, or in different orders. For brevity, many of the details discussed with reference to the preceding FIGS. 1-16 may not be discussed or repeated hereafter.

Method 1700 begins at block 1701 with observing or receiving a 3D real object, such as human head, other parts of human body, animals, plants, non-living objects, such as rocks, paintings, furniture, etc. In one embodiment, the object may include a live object that is captured and observed, in real-time, by an array of cameras at a computing device. In another embodiment, the object may include a recorded object that may be accessed at one or computing devices or obtained via one or more communication applications, such as email applications, SMS applications, collaboration applications, etc. For brevity, we presume the computing device, such as computing device 1300 of FIG. 13, to have imaging mechanism 1310 of FIGS. 13-14 and to serve as both the receiving or target device and transmitting or source device. At block 1703, in one embodiment, a high-resolution imagery of the object may be captured, in real-time, by one or more cameras of the array of cameras; or in another embodiment, the high-resolution imagery of the object may be extracted from any data associated with the object, such as a recorded object. At block 1705, the depth of the object is computed while the object is segmented out of its background, such as a human face or head is segmented out of the painting and/or the wall behind it. At block 1707, a 3D model of the real object is generated by interpolating the high-resolution imagery.

At block 1709, in one embodiment, using the 3D model, multiple images are generated that are then to be projected by multiple projectors, such as micro-projectors, using a dynamic 3D shape component (e.g., deformable surface, volumetric display, etc.), such as each of the multiple images is projected on the dynamic 3D shape component by a micro-projector. At block 1711, a high-resolution textured imagery-based unified surface image is generated and projected on the dynamic 3D shape component, wherein the unified surface image is generated by combining and calibrating the multiple images in a single image. At block 1713, a true 3D virtual image is generated based on the unified surface image which is then to be projected for the viewer via an imaging plate (e.g., Asukanet plate). At block 1715, in one embodiment, the 3D virtual image is the presented to the viewer by having it projected via the imaging plate such that the virtual image is realistic in nature while floating in mid-air and having the depth, form, features, and other characteristics of the 3D real object.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate true three-dimensional (3D) virtual imaging on computing devices, comprising: computation and segmentation logic of rendering engine to compute a virtual 3D model corresponding to an object; dynamic 3D image computation and projection logic of the rendering engine to compute and project, based the virtual 3D model, a unified surface image of the object via a dynamic 3D shape component; and virtual image generation and rendering logic of the rendering engine to generate and render a virtual image of the object based on the unified surface image, wherein the virtual image is capable of floating in air.

Example 2 includes the subject matter of Example 1, wherein the computation and segmentation logic is further to compute depth of the object based on high-resolution imagery of the object, and segment, based on the depth, the object from a background associated with the object.

Example 3 includes the subject matter of Example 1, wherein the object comprises a 3D real object having a live object or a recorded object, wherein the live object is captured, in real-time, by detection and verification logic via one or more cameras coupled to the computing device, wherein the detection and verification logic is further to capture the high-resolution imagery of the live object.

Example 4 includes the subject matter of Example 3, wherein the recorded object is obtained by reception logic, wherein the recorded object is obtained by directly accessing one or more computing devices having the recorded object or indirectly via one or more communication applications including one or more of an email application, a Short Message Service (SMS) application, and a collaboration application, wherein the reception logic is further to extract the high-resolution imagery from data associated with the recorded object.

Example 5 includes the subject matter of Example 1, wherein the dynamic 3D image computation and projection logic is further to project, based on the virtual 3D model, multiple 3D-shaped images of the object via the dynamic 3D shape component such that the multiple 3D-shaped images are projected as a single 3D image represented by the unified surface image, wherein each of the multiple 3D-shaped images is projected by a projector of a plurality of projectors.

Example 6 includes the subject matter of Example 1, wherein the virtual generation and rendering logic is further to render the virtual image via an optical imaging plate and based on the unified surface image, wherein the unified surface image is reversed via the optical imaging plate and rendered in the air such that virtual floats in the air, wherein the virtual image includes a 3D virtual image representing one or more of the depth, form, features, and characteristics of the object.

Example 7 includes the subject matter of Example 6, wherein the optical imaging plate comprises an Asukanet plate.

Example 8 includes the subject matter of Example 1, wherein the dynamic 3D shape component comprises one or more of a deformable surface and a volumetric display.

Some embodiments pertain to Example 9 that includes a method for facilitating true three-dimensional (3D) virtual imaging on computing devices, comprising: computing a virtual 3D model corresponding to an object; computing and projecting, based the virtual 3D model, a unified surface image of the object via a dynamic 3D shape component; and generating and rendering a virtual image of the object based on the unified surface image, wherein the virtual image is capable of floating in air.

Example 10 includes the subject matter of Example 9, further comprising computing depth of the object based on high-resolution imagery of the object, and segmenting, based on the depth, the object from a background associated with the object.

Example 11 includes the subject matter of Example 9, wherein the object comprises a 3D real object having a live object or a recorded object, wherein the live object and the high-resolution imagery are captured, in real-time, via one or more cameras coupled to the computing device.

Example 12 includes the subject matter of Example 11, wherein the recorded object is obtained by directly accessing one or more computing devices having the recorded object or indirectly via one or more communication applications including one or more of an email application, a Short Message Service (SMS) application, and a collaboration application, wherein the high-resolution imagery is extracted from data associated with the recorded object.

Example 13 includes the subject matter of Example 9, further comprising projecting, based on the virtual 3D model, multiple 3D-shaped images of the object via the dynamic 3D shape component such that the multiple 3D-shaped images are projected as a single 3D image represented by the unified surface image, wherein each of the multiple 3D-shaped images is projected by a projector of a plurality of projectors.

Example 14 includes the subject matter of Example 9, further comprising rendering the virtual image via an optical imaging plate and based on the unified surface image, wherein the unified surface image is reversed via the optical imaging plate and rendered in the air such that virtual floats in the air, wherein the virtual image includes a 3D virtual image representing one or more of the depth, form, features, and characteristics of the object.

Example 15 includes the subject matter of Example 14, wherein the optical imaging plate comprises an Asukanet plate.

Example 16 includes the subject matter of Example 9, wherein the dynamic 3D shape component comprises one or more of a deformable surface and a volumetric display.

Example 17 includes at least one machine-readable medium comprising a plurality of instructions, when executed on a computing device, to implement or perform a method or realize an apparatus as claimed in any preceding claims.

Example 18 includes at least one non-transitory or tangible machine-readable medium comprising a plurality of instructions, when executed on a computing device, to implement or perform a method or realize an apparatus as claimed in any preceding claims.

Example 19 includes a system comprising a mechanism to implement or perform a method or realize an apparatus as claimed in any preceding claims.

Example 20 includes an apparatus comprising means to perform a method as claimed in any preceding claims.

Example 21 includes a computing device arranged to implement or perform a method or realize an apparatus as claimed in any preceding claims.

Example 22 includes a communications device arranged to implement or perform a method or realize an apparatus as claimed in any preceding claims.

Some embodiments pertain to Example 23 includes a system comprising a storage device having instructions, and a processor to execute the instructions to facilitate a mechanism to perform one or more operations comprising: computing a virtual 3D model corresponding to an object; computing and projecting, based the virtual 3D model, a unified surface image of the object via a dynamic 3D shape component; and generating and rendering a virtual image of the object based on the unified surface image, wherein the virtual image is capable of floating in air.

Example 24 includes the subject matter of Example 23, wherein the one or more operations further comprise computing depth of the object based on high-resolution imagery of the object, and segmenting, based on the depth, the object from a background associated with the object.

Example 25 includes the subject matter of Example 23, wherein the object comprises a 3D real object having a live object or a recorded object, wherein the live object and the high-resolution imagery are captured, in real-time, via one or more cameras coupled to the computing device.

Example 26 includes the subject matter of Example 25, wherein the recorded object is obtained by directly accessing one or more computing devices having the recorded object or indirectly via one or more communication applications including one or more of an email application, a Short Message Service (SMS) application, and a collaboration application, wherein the high-resolution imagery is extracted from data associated with the recorded object.

Example 27 includes the subject matter of Example 23, wherein the one or more operations further comprise projecting, based on the virtual 3D model, multiple 3D-shaped images of the object via the dynamic 3D shape component such that the multiple 3D-shaped images are projected as a single 3D image represented by the unified surface image, wherein each of the multiple 3D-shaped images is projected by a projector of a plurality of projectors.

Example 28 includes the subject matter of Example 23, wherein the one or more operations further comprise rendering the virtual image via an optical imaging plate and based on the unified surface image, wherein the unified surface image is reversed via the optical imaging plate and rendered in the air such that virtual floats in the air, wherein the virtual image includes a 3D virtual image representing one or more of the depth, form, features, and characteristics of the object.

Example 29 includes the subject matter of Example 28, wherein the optical imaging plate comprises an Asukanet plate.

Example 30 includes the subject matter of Example 23, wherein the dynamic 3D shape component comprises one or more of a deformable surface and a volumetric display.

Some embodiments pertain to Example 31 includes an apparatus comprising: means for computing a virtual 3D model corresponding to an object; means for computing and projecting, based the virtual 3D model, a unified surface image of the object via a dynamic 3D shape component; and means for generating and rendering a virtual image of the object based on the unified surface image, wherein the virtual image is capable of floating in air.

Example 32 includes the subject matter of Example 31, further comprising means for computing depth of the object based on high-resolution imagery of the object, and means for segmenting, based on the depth, the object from a background associated with the object.

Example 33 includes the subject matter of Example 31, wherein the object comprises a 3D real object having a live object or a recorded object, wherein the live object and the high-resolution imagery are captured, in real-time, via one or more cameras coupled to the computing device.

Example 34 includes the subject matter of Example 33, wherein the recorded object is obtained by directly accessing one or more computing devices having the recorded object or indirectly via one or more communication applications including one or more of an email application, a Short Message Service (SMS) application, and a collaboration application, wherein the high-resolution imagery is extracted from data associated with the recorded object.

Example 35 includes the subject matter of Example 31, further comprising means for projecting, based on the virtual 3D model, multiple 3D-shaped images of the object via the dynamic 3D shape component such that the multiple 3D-shaped images are projected as a single 3D image represented by the unified surface image, wherein each of the multiple 3D-shaped images is projected by a projector of a plurality of projectors.

Example 36 includes the subject matter of Example 31, further comprising means for rendering the virtual image via an optical imaging plate and based on the unified surface image, wherein the unified surface image is reversed via the optical imaging plate and rendered in the air such that virtual floats in the air, wherein the virtual image includes a 3D virtual image representing one or more of the depth, form, features, and characteristics of the object.

Example 37 includes the subject matter of Example 36, wherein the optical imaging plate comprises an Asukanet plate.

Example 38 includes the subject matter of Example 31, wherein the dynamic 3D shape component comprises one or more of a deformable surface and a volumetric display.

Example 39 includes at least one non-transitory or tangible machine-readable medium comprising a plurality of instructions, when executed on a computing device, to implement or perform a method as claimed in any of claims or examples 9-16.

Example 40 includes at least one machine-readable medium comprising a plurality of instructions, when executed on a computing device, to implement or perform a method as claimed in any of claims or examples 9-16.

Example 41 includes a system comprising a mechanism to implement or perform a method as claimed in any of claims or examples 9-16.

Example 42 includes an apparatus comprising means for performing a method as claimed in any of claims or examples 9-16.

Example 43 includes a computing device arranged to implement or perform a method as claimed in any of claims or examples 9-16.

Example 44 includes a communications device arranged to implement or perform a method as claimed in any of claims or examples 9-16.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a processing device to facilitate:
computation and segmentation logic of a rendering engine to compute a virtual three-dimensional (3D) model of a real object captured by one or more devices and to segment the 3D model from a background of the real object captured by the one or more objects, using depth information of the real object, such that the 3D model is of the real object without the background of the real object;
dynamic 3D image computation and projection logic of the rendering engine to compute and project, based on the virtual 3D model of the real object, a unified surface image of the real object via a dynamic 3D shape component, wherein the dynamic 3D image computation and projection logic is configured to modify the shape of the dynamic 3D shape component based on the virtual 3D model of the real object; and
virtual image generation and rendering logic of the rendering engine to generate and render a virtual image of the real object based on the unified surface image from the dynamic 3D shape component, wherein the virtual generation and rendering logic is further to render the virtual image via an optical imaging plate and based on the unified surface image, wherein the unified surface image is reversed by the optical imaging plate.

2. The apparatus of claim 1, wherein the 3D model is a full scale virtual 3D model of the real object.

3. The apparatus of claim 1, wherein the real object comprises a 3D real object having a live object or a recorded object, wherein the live object is captured, in real-time, by detection and verification logic via one or more cameras coupled to the computing device, wherein the detection and verification logic is further to capture the high-resolution imagery of the live object.

4. The apparatus of claim 3, wherein the recorded object is obtained by reception logic, wherein the recorded object is obtained by directly accessing one or more computing devices having the recorded object or indirectly via one or more communication applications including one or more of an email application, a Short Message Service (SMS) application, and a collaboration application, wherein the reception logic is further to extract the high-resolution imagery from data associated with the recorded object.

5. The apparatus of claim 1, wherein the dynamic 3D image computation and projection logic is further to project, based on the virtual 3D model, multiple 3D-shaped images of the real object via the dynamic 3D shape component such that the multiple 3D-shaped images are projected as a single 3D image represented by the unified surface image, wherein each of the multiple 3D-shaped images is projected by a projector of a plurality of projectors.

6. The apparatus of claim 1, wherein the optical imaging plate comprises an Asukanet plate.

7. The apparatus of claim 1, wherein the dynamic 3D shape component further comprises a volumetric display.

8. The apparatus of claim 1, wherein the optical imaging plate and renders a floating 3D virtual image representing one or more of the depth, form, features, and characteristics of the real object.

9. A method comprising:
computing, by a computing device, a virtual three-dimensional (3D) model of a real object captured by one or more devices;
segmenting the 3D model from a background of the real object captured by the one or more objects, using depth information of the real object, such that the 3D model is of the real object without the background of the real object;
computing and projecting, by the computing device, based on the virtual 3D model of the real object, a unified surface image of the real object via a dynamic 3D shape component, wherein the dynamic 3D image computation and projection logic is configured to modify the shape of the dynamic 3D shape component based on the virtual 3D model; and
generating and rendering, by the computing device, a virtual image of the real object based on the unified surface image, wherein the rendering of the virtual image is via an optical imaging plate and based on the unified surface image, wherein the unified surface image is reversed by the optical imaging plate.

10. The method of claim 9, wherein the 3D model is a full scale virtual 3D model of the real object.

11. The method of claim 9, wherein the real object comprises a 3D real object having a live object or a recorded object, wherein the live object and the high-resolution imagery are captured, in real-time, via one or more cameras coupled to the computing device.

12. The method of claim 11, wherein the recorded object is obtained by directly accessing one or more computing devices having the recorded object or indirectly via one or more communication applications including one or more of an email application, a Short Message Service (SMS) application, and a collaboration application, wherein the high-resolution imagery is extracted from data associated with the recorded object.

13. The method of claim 9, further comprising projecting, based on the virtual 3D model, multiple 3D-shaped images of the real object via the dynamic 3D shape component such that the multiple 3D-shaped images are projected as a single 3D image represented by the unified surface image, wherein each of the multiple 3D-shaped images is projected by a projector of a plurality of projectors.

14. The method of claim 9, wherein the optical imaging plate comprises an Asukanet plate.

15. The method of claim 9, wherein the dynamic 3D shape component comprises one or more of a deformable surface and a volumetric display.

16. At least one non-transitory machine-readable medium comprising a plurality of instructions, executed on a computing device, to facilitate the computing device to perform one or more operations comprising:
computing a virtual three-dimensional (3D) model of aft a real object captured by one or more devices;
segmenting the 3D model from a background of the real object captured by the one or more objects, using depth information of the real object, such that the 3D model is of the real object without the background of the real object;
computing and projecting, based the virtual 3D model of the real object, a unified surface image of the real object via a dynamic 3D shape component, wherein the dynamic 3D image computation and projection logic is configured to modify the shape of the dynamic 3D shape component based on the virtual 3D model; and
generating and rendering a virtual image of the real object based on the unified surface image from the dynamic 3D shape component, wherein the virtual generation and rendering logic is further to render the virtual image via an optical imaging plate and based on the unified surface image, wherein the unified surface image is reversed by the optical imaging plate.

17. The non-transitory machine-readable medium of claim 16, wherein the 3D model is a full scale virtual 3D model of the real object.

18. The non-transitory machine-readable medium of claim 16, wherein the real object comprises a 3D real object having a live object or a recorded object, wherein the live object and the high-resolution imagery are captured, in real-time, via one or more cameras coupled to the computing device.

19. The non-transitory machine-readable medium of claim 18, wherein the recorded object is obtained by directly accessing one or more computing devices having the recorded object or indirectly via one or more communication applications including one or more of an email application, a Short Message Service (SMS) application, and a collaboration application, wherein the high-resolution imagery is extracted from data associated with the recorded object.

20. The non-transitory machine-readable medium of claim 16, further comprising projecting, based on the virtual 3D model, multiple 3D shaped images of the real object via the dynamic 3D shape component such that the multiple 3D-shaped images are projected as a single 3D image represented by the unified surface image, wherein each of the multiple 3D-shaped images is projected by a projector of a plurality of projectors.

21. The non-transitory machine-readable medium of claim 16, wherein the optical imaging plate comprises an Asukanet plate.

22. The non-transitory machine-readable medium of claim 16, wherein the dynamic 3D shape component comprises one or more of a deformable surface and a volumetric display.

* * * * *